United States Patent
Taylor et al.

(10) Patent No.: US 8,247,747 B2
(45) Date of Patent: Aug. 21, 2012

(54) PLASTICATING BARREL WITH INTEGRATED EXTERIOR HEATER LAYER

(75) Inventors: Bruce F. Taylor, Worthington, OH (US); Richard D. Palmer, Grove City, PA (US); Bruce E. Hyllberg, Gurnee, IL (US); Timothy W. Womer, Edinburg, PA (US)

(73) Assignee: Xaloy, Inc., New Castle, PA (US)

( * ) Notice: Subject to any disclaimer, the term of this patent is extended or adjusted under 35 U.S.C. 154(b) by 449 days.

(21) Appl. No.: 12/608,638

(22) Filed: Oct. 29, 2009

(65) Prior Publication Data

US 2010/0108662 A1    May 6, 2010

Related U.S. Application Data

(60) Provisional application No. 61/197,719, filed on Oct. 30, 2008.

(51) Int. Cl.
*H05B 3/06* (2006.01)
*H05B 3/16* (2006.01)

(52) U.S. Cl. ........ 219/543; 219/440; 219/470; 219/476; 219/521; 219/546; 219/547

(58) Field of Classification Search .................. 219/543, 219/521, 470, 440, 546, 547
See application file for complete search history.

(56) References Cited

U.S. PATENT DOCUMENTS

| | | | |
|---|---|---|---|
| 4,548,341 A | 10/1985 | Hambleton | |
| 5,147,663 A | 9/1992 | Trakas | |
| 5,408,070 A | 4/1995 | Hyllberg et al. | |
| 5,420,395 A | 5/1995 | Hyllberg et al. | |
| 5,616,263 A | 4/1997 | Hyllberg et al. | |
| 5,821,499 A | 10/1998 | Crimmins et al. | |
| 5,869,808 A | 2/1999 | Hyllberg et al. | |
| 5,984,848 A | 11/1999 | Hyllberg et al. | |
| 5,990,458 A | 11/1999 | Hyllberg et al. | |
| 6,069,346 A | 5/2000 | Hyllberg et al. | |
| 6,285,006 B1 | 9/2001 | Hyllberg et al. | |
| 6,717,118 B2* | 4/2004 | Pilavdzic et al. | 219/601 |
| 2003/0066638 A1 | 4/2003 | Qu et al. | |
| 2004/0016746 A1* | 1/2004 | Ito et al. | 219/444.1 |
| 2004/0074891 A1 | 4/2004 | Pendergraft | |
| 2005/0284859 A1 | 12/2005 | Konishi | |
| 2008/0017370 A1* | 1/2008 | Vinegar et al. | 166/248 |
| 2008/0087359 A1 | 4/2008 | Zurecki et al. | |
| 2008/0136066 A1 | 6/2008 | Taylor et al. | |
| 2009/0321075 A1* | 12/2009 | Harris et al. | 166/302 |

FOREIGN PATENT DOCUMENTS

GB      2278262      11/1994

* cited by examiner

*Primary Examiner* — Nitin Parekh
(74) *Attorney, Agent, or Firm* — Roth, Blair, Roberts, Strasfeld & Lodge

(57) ABSTRACT

A plasticating barrel is provided with a primary heating system having at least one laminated ceramic heater, where the ceramic heater has an electrical insulating layer interposed between the ceramic heater layer and an outer wall of the barrel, and the longitudinal length of the ceramic heater is arranged over a portion of the barrel length. A secondary heating system may also be provided and overlaps, at least in part, the primary heating system.

17 Claims, 25 Drawing Sheets

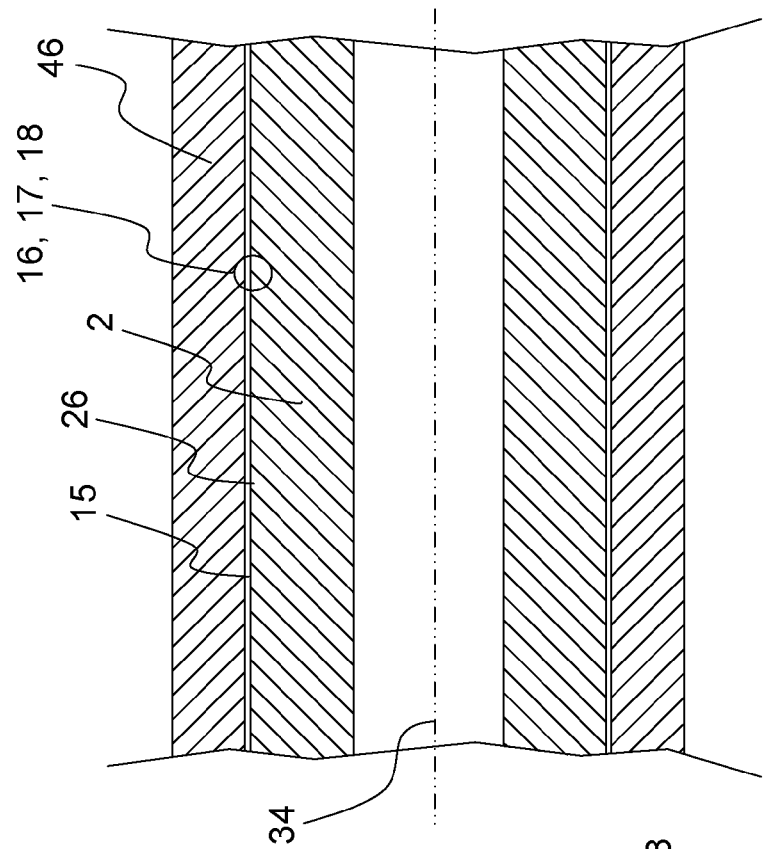
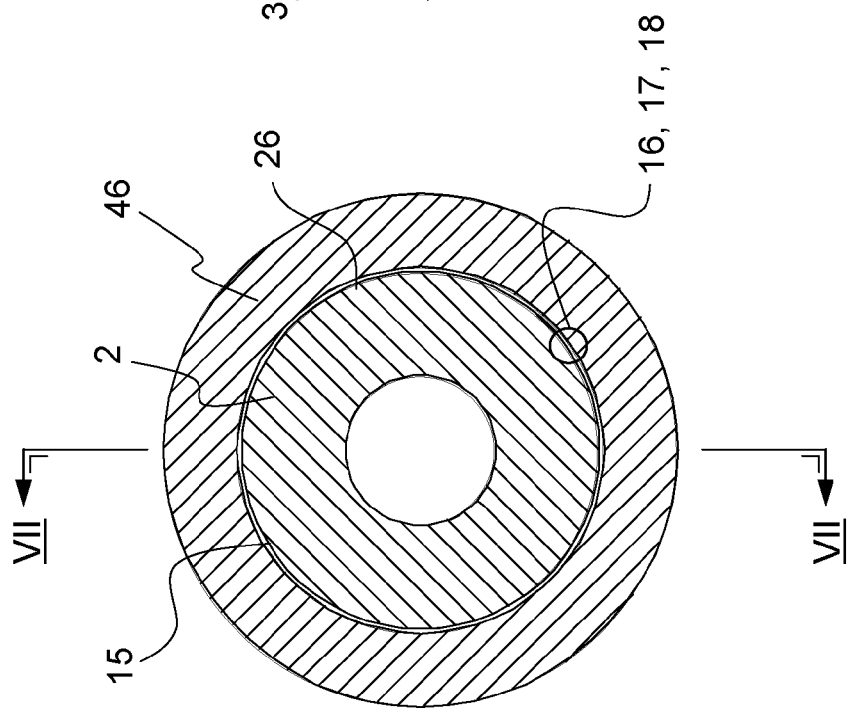
FIG. 7B
FIG. 7A

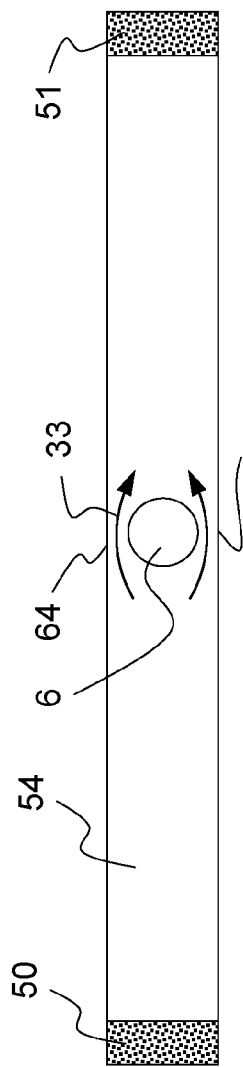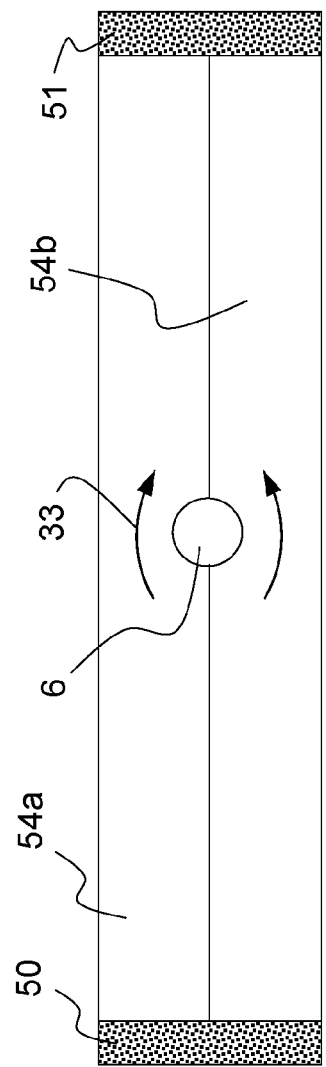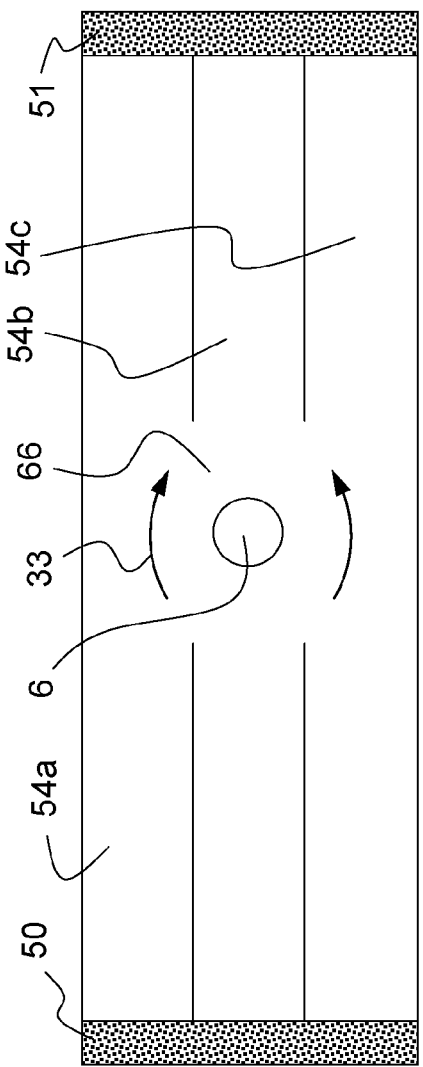

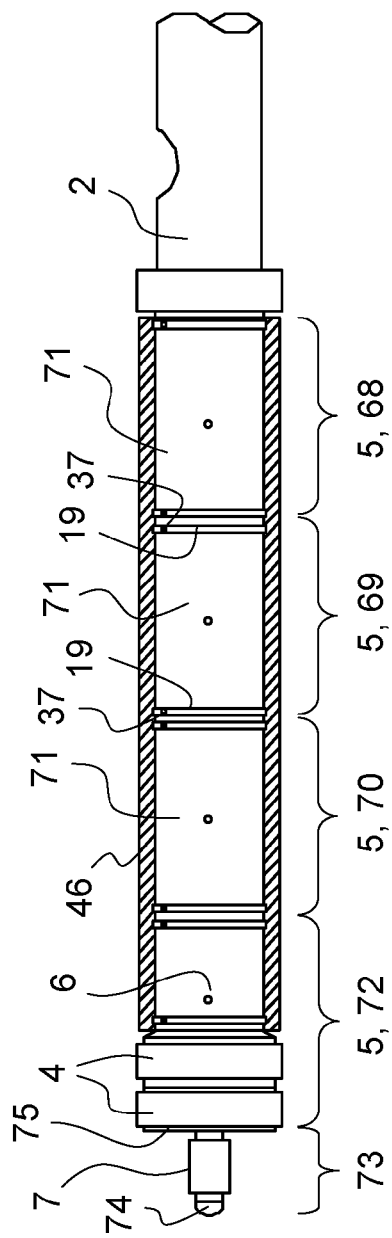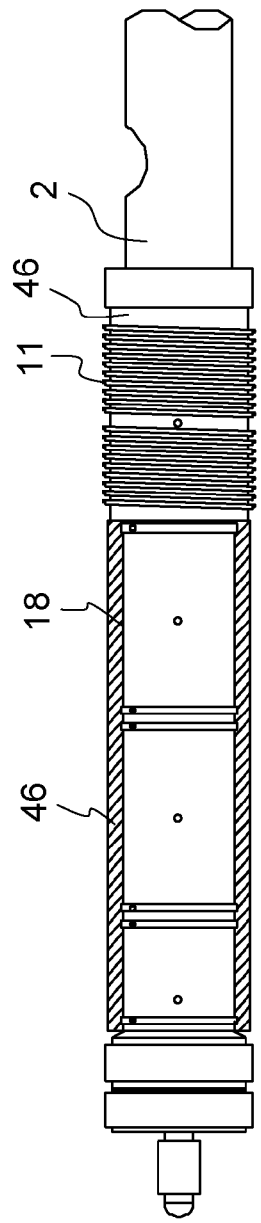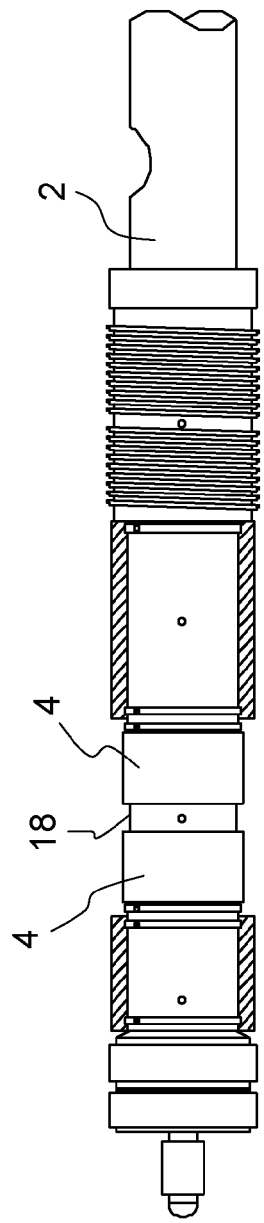

PLASTICATING BARREL WITH INTEGRATED EXTERIOR HEATER LAYER

This application claims priority to and the benefit of U.S. Provisional Application No. 61/197,719, filed Oct. 30, 2008, the full disclosures of which are incorporated herein by reference.

BACKGROUND OF THE INVENTION

1. Field of the Invention

This invention relates to heating of a metal cylindrical element used in the injection molding or extrusion of feed materials such as plastic resins, formable foodstuffs (i.e. pasta) and appropriate metals (i.e. magnesium). Relevant heated cylindrical elements include barrels, feed pipes or adaptor pipes, dies, nozzles, etc. All such elements are typically heated with resistive contact heaters and are used to plasticate the feed materials by some combination of heating, melting, shearing, mixing, metering and conveying, prior to discharging them under pressure through a nozzle or die. The description of the invention herein focuses on its application to a barrel, but the principles, methods and merits of the invention are equally applicable to any heated cylindrical metal element used in the plasticating of feed materials.

2. Description of the Prior Art

Referring now to FIG. 1, solid plastic feed material, typically in the form of pellets or powder, enters the feed end 1 of the barrel 2 and then is sheared, mixed and metered by a screw 100 that rotates within the barrel 2. The resulting molten material is then forced out under pressure through a nozzle or die at the discharge end 3 of the barrel. To help melt the material, the barrel 2 is also heated, conventionally with external resistive contact heaters 4 commonly referred to as band-heaters.

AC induction has also been used to heat cylindrical plasticating elements such as injection molding and extrusion barrels, by inducing eddy currents within the cylinder's wall to produce direct resistive heating of the cylinder or barrel 2. Improved commercialized induction barrel heating systems include a substantial thermal insulating layer between the induction coils and the barrel to increase barrel-heating efficiency and reduce temperature control response time. A suitable such induction barrel heating system is described in U.S. patent application titled "Apparatus and Method for Inductive Heating a Workpiece Using an Interposed Thermal Insulating Layer", published Jun. 12, 2008 at U.S. Publication No. 2008-0136066, The band-heater's or induction heating system's electrical circuitry is usually arranged so that the barrel 2 can be heated in multiple controllable zones 5 along its length (typically three to six zones, but fewer or more are possible), with typically one thermocouple 6 located in the barrel wall per zone to provide temperature measurement feedback. The nozzle or die at the discharge end 3 is usually heated and temperature controlled separately using one or more dedicated band-heaters 7.

Referring still to FIG. 1, band-heaters 4 add substantial thermal mass to the barrel 2, increasing temperature control response times and making it more difficult to control processing temperatures, particularly under changing conditions. The controllability of band-heaters is also further diminished, and they are increasingly prone to overheating and premature failure, if they are covered by thermal insulation 8. For these reasons, band-heaters 4 are usually left exposed to ambient, which unfortunately leads to significant heat losses and waste of energy.

Referring next to FIGS. 2A and 2B, recent AC induction barrel heating systems 9 eliminate the thermal inertia of the barrel heating means to improve control response. Induction barrel heating systems 9 typically also incorporate a layer of thermal insulation 10 interposed between the barrel 2 and the external induction coils 11 to eliminate heat losses to ambient. However, in spite of their advantages, induction systems 9 have the drawback of specialized components that can be relatively expensive, including high-frequency power supplies 12, and depending on the application, specialized coil cables 11. Together, these power supplies 12 and induction coils 11 can also incur heat losses of typically between 5% on high-performance systems and 20% on relatively inexpensive, low-quality systems. And, finally, induction systems 9 require specialized power sources (voltage and number of phases) that often differ from those used by the band-heaters they replace.

As described in U.S. Pat. No. 6,285,006 B1 and illustrated in FIG. 3, rollers 13 used on sheet manufacturing and conversion processes, which have typically steel cores 14, can be manufactured with an internal or external laminated ceramic coating 15 (shown applied to the external surface of the roller in FIG. 3) that acts as a resistive heating layer. The laminated coating 15 comprises a first layer of electrical insulating material 16 applied to the inner or outer surface of the core 14 using a suitable method such as plasma spraying. To increase the bond-strength a bonding layer (not shown) can also be previously applied between the core 14 and electrical insulating layer 16.

A ceramic heating layer 17 is then applied on top of the electrical insulating layer 16 by a suitable method such as plasma spraying. A final optional layer or sequence of layers 18 can then be applied over top of the resistive heating layer 17 to provide external electrical insulation, added durability, or a surface sealing function to prevent contamination of the resistive heating layer 17. This final external layer or series of layers can also be applied by a suitable means such as plasma spraying. Electrodes 19 can then be used to connect an external DC or AC power source 20 to the ceramic heater layer 17 in order to generate resistive heating of the heater layer 17 and hence the roll 13.

As further noted in U.S. Pat. No. 6,285,006 B1, various materials can be used for each layer 16, 17, 18 and the layer thicknesses can be adjusted to provide various properties. As cited in U.S. Pat. No. 6,285,006 B1, suitable materials and thicknesses for use on a 75 mm (3 inch) diameter×400 mm (16 inch) long steel cylinder would be:

Optional Bonding layer—100μ (4 mil) Sulzer Metco 480 nickel aluminide bond coat;
Inner electrical insulating layer 16—250μ (10 mil) Saint Gobin 204 stabilized zirconia;
Ceramic resistive heating layer 17—12-25μ (0.5 to 1 mil) Eutectic 25040 titanium dioxide; and
ptional outer electrical insulating layer 18—250μ (10 mil) Saint Gobin 204 stabilized zirconia.

Referring still to FIG. 3, U.S. Pat. No. 6,285,006 B1 also describes an example in which a 75 mm (3 inch) diameter 21 by 400 mm (16 inch) long 22 steel roller core 14 is coated with the above materials to produce a ceramic heater layer 17 with an electrical resistance of about 29 ohms, resulting in a heat generation rate of about 2000 watts when 240 volts AC is applied across the electrodes 19. With a roller surface area of about 970 $cm^2$ (150 $inch^2$) this equates to a heat generation density of about 2.1 watts/$cm^2$ (13.3 watts/$inch^2$). The roller in this example is then cycled over 800 times from 70° C. (160° F.) to 315° C. (600° F.) without failure, and operated at up to 370° C. (700° F.) before failing.

Referring now to FIGS. 1 and 3, there is little difference between a steel roller core 14 and a steel cylindrical plasticating element such as a barrel 2, so it follows that the functional layers 16, 17 and 18 described in the above example could be applied in the same manner to the external diameter 23 of a plasticating barrel 2 over any length-wise portion 24. Furthermore, it follows from basic electrical engineering principles that as the roller core diameter 21 or barrel diameter 23 are changed, the heat generation density (i.e. watts/cm$^2$) will remain essentially the same (provided the thickness 25 of the heater layer 17, the length of the roller segment 22 or barrel segment 24 between the electrodes 19, and the applied voltage, all remain unchanged). This is because the axial cross-sectional area of the heater layer 17 increases linearly with roller diameter 21 or barrel diameter 23, thereby reducing the electrical resistance of the heater layer 17 inversely with the diameter 21, 23, which in turn linearly increases the dissipated power to maintain a constant heat generation density. It also follows that if the length of the roller segment 22 or barrel segment 24 is changed, the thickness 25 of the heater layer 17 must be inversely changed to maintain a constant heat generation density. In practice, the electrical resistance of the heater layer 17 decreases in a non-linear fashion as its thickness 25 is reduced and this relationship must be taken into account when specifying the thickness 25 needed to achieve a given heat generation density.

The operating temperature of the heated cylindrical plasticating elements (such as barrels) used in the vast majority of injection molding and extrusion applications is below 315° C. (600° F.). In addition, as indicated in Table 1, the required heat generation density of most barrel heating applications remains essentially constant and below about 2.4 watts/cm$^2$ during machine startup and 1.2 watts/cm$^2$ during normal production conditions. Referring again to FIGS. 1 and 3, most barrels 2 also have heater control zones lengths 5 of 200 to 1200 mm (8 to 48 inches), meaning that ceramic heater layer thickness 25 of under 4 mils should be adequate in most cases, provided a ceramic heater layer material is used that has similar properties to that used in the example above.

Furthermore, most injection molding and extrusion operations shut down and start back up only about once per week, equating to only about 50 full-temperature cycles per year, and therefore well under 1,000 cycles over a 15-year machine life. Plasticating barrel applications are also static, unlike the dynamic rotating loads experienced on roller applications. The external surface 26 of plasticating barrels 2 is also not normally exposed to regular wearing contact, nor is the external surface's condition critically important to the proper functioning of the barrel 2.

The laminated ceramic coating 15 applied to rollers 14 as described above should, therefore, be equally applicable to plasticating barrels 2 having typical external diameters 23 and operating at typical processing temperatures.

TABLE 1

| Typical Plasticating Barrel Specifications | | | | | | |
|---|---|---|---|---|---|---|
| Screw Diameter | mm | 20 | 60 | 100 | 140 | 180 |
|  | inch | 0.79 | 2.36 | 3.94 | 5.51 | 7.09 |
| Barrel approx. length (L/D = 19) | mm | 380 | 1140 | 1900 | 2660 | 3420 |
|  | inch | 15.0 | 44.9 | 74.8 | 104.7 | 134.6 |
| Typical barrel sell price | USD | 1389 | 2385 | 3212 | 5508 | 8124 |
| Barrel approx. outside diameter | mm | 79 | 154 | 230 | 305 | 380 |
| Barrel approx. heated surface area | cm$^2$ | 943 | 5526 | 13705 | 25481 | 40854 |
| Nominal number of zones | per barrel | 3 | 4 | 5 | 6 | 7 |
| Barrel approx. mass (incl. screw & resin) | kg | 15 | 167 | 616 | 1521 | 3042 |
| Band-heaters approximate total rated power | kW | 3.2 | 23 | 58 | 105 | 164 |
| Band-heater maximum power on startup | % | 100 | 100 | 100 | 100 | 100 |
|  | kW | 3.2 | 23 | 58 | 105 | 164 |
|  | watts/inch$^2$ | 22 | 27 | 27 | 27 | 26 |
|  | watts/cm$^2$ | 3.4 | 4.2 | 4.2 | 4.1 | 4.0 |
| Band-heater approx. efficiency on startup | % | 60 | 60 | 60 | 60 | 60 |
| Band-heater maximum barrel heating rate on startup | kW | 1.9 | 14 | 35 | 63 | 99 |
|  | watts/cm$^2$ | 2.1 | 2.5 | 2.5 | 2.5 | 2.4 |
| Band-heater power use during production (approx. total) | % | 30 | 30 | 30 | 30 | 30 |
|  | kW | 1.0 | 6.9 | 17 | 31 | 49 |
|  | watts/cm$^2$ | 1.0 | 1.3 | 1.3 | 1.2 | 1.2 |

SUMMARY OF THE INVENTION

Accordingly, it is a primary object of the present invention to improve upon the conventional methods of heating barrel-like structures, such as plasticating barrels.

It is another object of the present invention to provide a heating system for barrel-like structures that includes the advantages of induction heating systems, including fast response and very low heat losses to ambient.

It is a further object of the present invention to provide a heating system for barrel-like structures in which the heating system can be protected easily from physical impact or abrasion.

It is an additional object of the present invention to reduce differential movement between a heated barrel and its heater.

It is still a further object of the present invention to provide heaters for a barrel-like structure to maintain relatively uniform heat density, where the heaters do not have extraordinary operating requirements.

It is yet another object of the present invention to provide a heater system for barrel-like structures in which interference between objects on the barrel and the heater system are easily avoided.

It is still another object of the present invention to provide a heater system for barrel-like structures wherein the electrical resistance of the heater system is easily predictable, thereby resulting in predictable heat density.

It is again an additional object of the present invention to provide a heater system for barrel-like structures, which easily operates in a wide variety of different electrical environments.

It is still a further object of the present invention to provide a heater system for barrel-like structures in which substantial heater redundancy and controllability is achieved.

It is yet a further object of the present invention to provide a heater system for barrel-like structures in which a high level of heat density control is facilitated.

It is still an additional object of the present invention to provide a heater system for barrel-like structures in which temperature variation along the barrel-like structure can be configured as desired, thereby avoiding "hot spots".

It is yet another object of the present invention to provide a heating system for barrel-like structures in which selected temperature levels at various parts of the barrel-like structure can be easily maintained.

It is again a further object of the present invention to provide a heating system for barrel-like structures which is simple, inexpensive, and easily controllable, without special power requirements on equipment.

It is still another object of the present invention to provide a heating system for barrel-like structures in which the overall system maintains high thermal efficiency while providing desired heat density.

It is yet an additional object of the present invention to provide a heater system which is particularly adapted for plasticating barrels.

It is still a further object of the present invention to provide a heating system for plasticating barrels in which cooling devices can easily be inserted to control barrel temperature.

It is again another object of the present invention to provide a heating system for a plasticating barrel in which the heater remains attached to the barrel under all operating conditions.

It is still another object of the present invention to provide a heating system for a plasticating barrel wherein additional heaters and insulation can readily be added to the heated plasticated barrel.

It is yet an additional object of the present invention to provide a heater for a plasticating barrel in which electrical redundancy, as well as thermal redundancy, is easily achieved.

These and other goals and objects of the present invention are achieved by an apparatus for plasticizing resinous materials. The apparatus includes an electrically conductive barrel having a longitudinal axis along which materials move axially from an inlet to an outlet. A rotatable screw is disposed within the barrel, and cooperates with an inner wall of the barrel for plasticating resinous material fed into the barrel through the inlet. The screw has a longitudinal axis and a main flight having a pitch arranged helically on and extending radially from a core of the screw so as to form a channel. The primary heating system includes at least one laminated ceramic heater having a longitudinal length arranged along the longitudinal axis of the barrel. The ceramic heater has an electrical insulating layer interposed between the ceramic heater layer and the outer wall of the barrel. The longitudinal length of the ceramic heater is arranged over a portion of the screw length. Also included is a secondary heating system arranged at least in part over the primary heating system.

BRIEF DESCRIPTION OF THE DRAWINGS

Having generally described the nature of the invention, reference will now be made to the accompanying drawings used to illustrate and describe the preferred embodiments thereof. Further, these and other advantages will become apparent to those skilled in the art from the following detailed description of the embodiments when considered in light of these drawings in which:

FIG. 7A is a sectional view of the plasticating barrel shown in FIGS. 5A and 6A, with the addition of an external thermal insulating layer;

FIG. 7B is a sectional view taken along lines VII-VII of the plasticating barrel shown in FIG. 7A;

FIG. 19A illustrates the surface layout of a single heater layer stripe interrupted by a thermocouple hole;

FIG. 19B illustrates the surface layout of two heater layer stripes interrupted by a thermocouple hole;

FIG. 19C illustrates the surface layout of multiple merged heater layer stripes interrupted by a thermocouple hole;

FIG. 22A is a partial sectional side-view of the plasticating barrel shown in FIG. 1 with the addition of ceramic barrel-heating zones;

FIG. 22B is a partial sectional side-view of the plasticating barrel shown in FIG. 22A with the addition of an induction heating system installed around the present invention in the feed zone;

FIG. 22C is a partial sectional side-view of the plasticating barrel shown in FIG. 22B with the addition of band-heaters installed around the present invention;

DESCRIPTION OF THE PREFERRED EMBODIMENT

The present invention uses a laminated ceramic coating comprised of multiple layers and applied directly to the exterior of a cylindrical plasticating element (i.e. barrel). The laminated ceramic coating is preferably applied using a process such as plasma spraying and then a layer of thermal insulation may be applied to, wrapped around, or sleeved over the laminated ceramic coating to thermally insulate the barrel. An annular gap may also be formed between the thermal insulation and the ceramic coating to permit forced-air cooling of the barrel.

Of the multiple layers, a ceramic heater layer may be formed in the laminated ceramic coating by applying a ceramic-metal blend (commonly known as a "cermet" material) whose coefficient of thermal expansion is much closer to that of steel than that of a pure ceramic layer. By matching the coefficients of thermal expansion between the heater layer and the underlying steel, cracking of the heater layer at elevated temperatures can be avoided or minimized. By minimizing the incidence of large-scale cracking, the life of the heater layer can be maximized. Also, by minimizing the incidence of micro-cracking, changes in the electrical resistance of the heater layer (versus temperature) can be minimized to produce a heater that has a predictable and sufficient heating rate across the operating temperature range.

The ceramic (or ceramic-metal) heater layer can also be applied in multiple axial stripes with intervening gaps. This enhancement reduces the overall surface area of the heater layer to increase its electrical resistance and allows the gaps between heater stripes to accommodate obstructions. The heater layer striping approach can be further optimized by employing one or more parallel spiral stripes. This spiral approach lengthens the path length for the electrical current to further increase the heater layer's electrical resistance, while still forming gaps that may accommodate obstructions. This preferred spiral striping approach has many advantages, including;

the ability to map the path of the stripes during manufacturing in order to bypass obstructions such as thermocouple holes;

allowing the applied heater layer to be thicker, thereby making it easier to apply consistently and making its resistance more predictable; and allowing the helix angle of the spirals to be adjusted to maintain a reasonable heat generation density (i.e. approximately 2 watts/cm$^2$) across a wide range of supply voltages. (This versatility is needed to permit the invention's application around the world in a wide range of electrical environments, i.e. from a low of about 100V in Japan to a high of about 600V in Canada).

Figure 1:
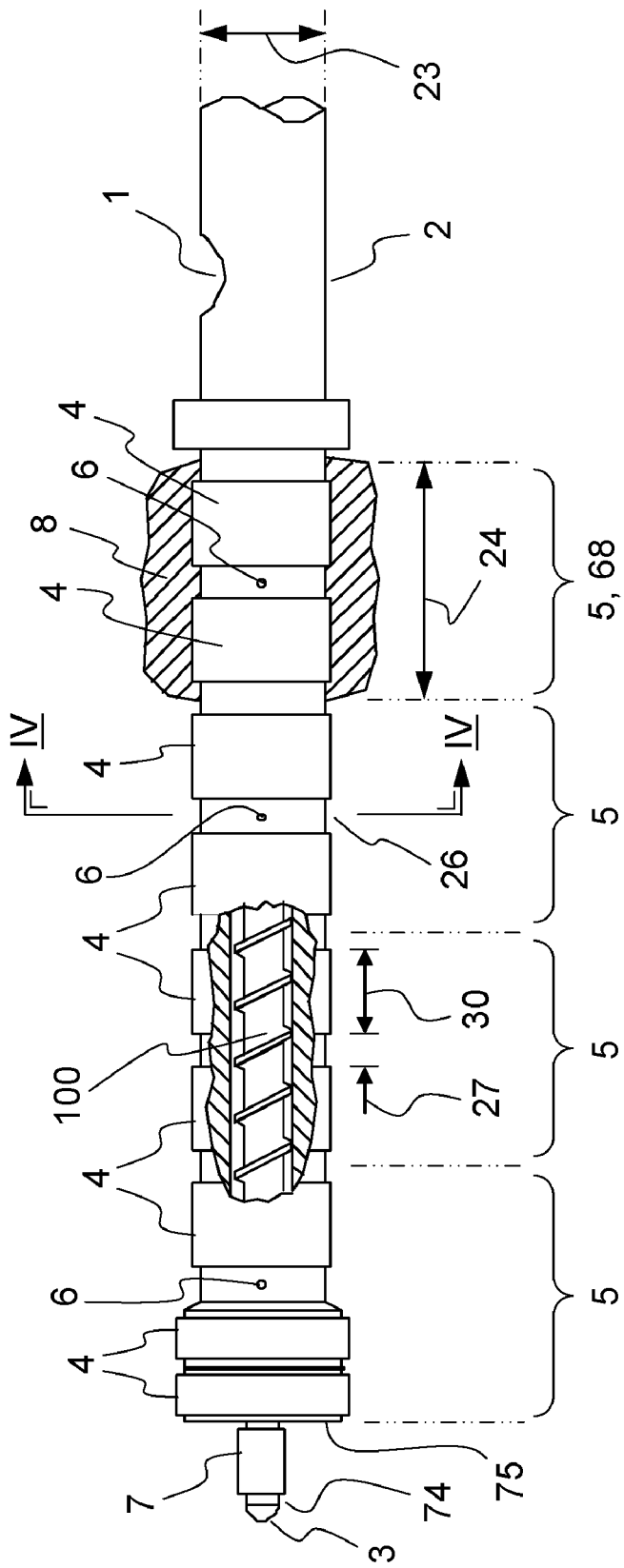
FIG. 1 is a side elevational view of a plasticating barrel with conventional external resistive heaters typically referred to as band-heaters, and including a partial cut-away showing the plasticating screw within the barrel.
Figure 4:
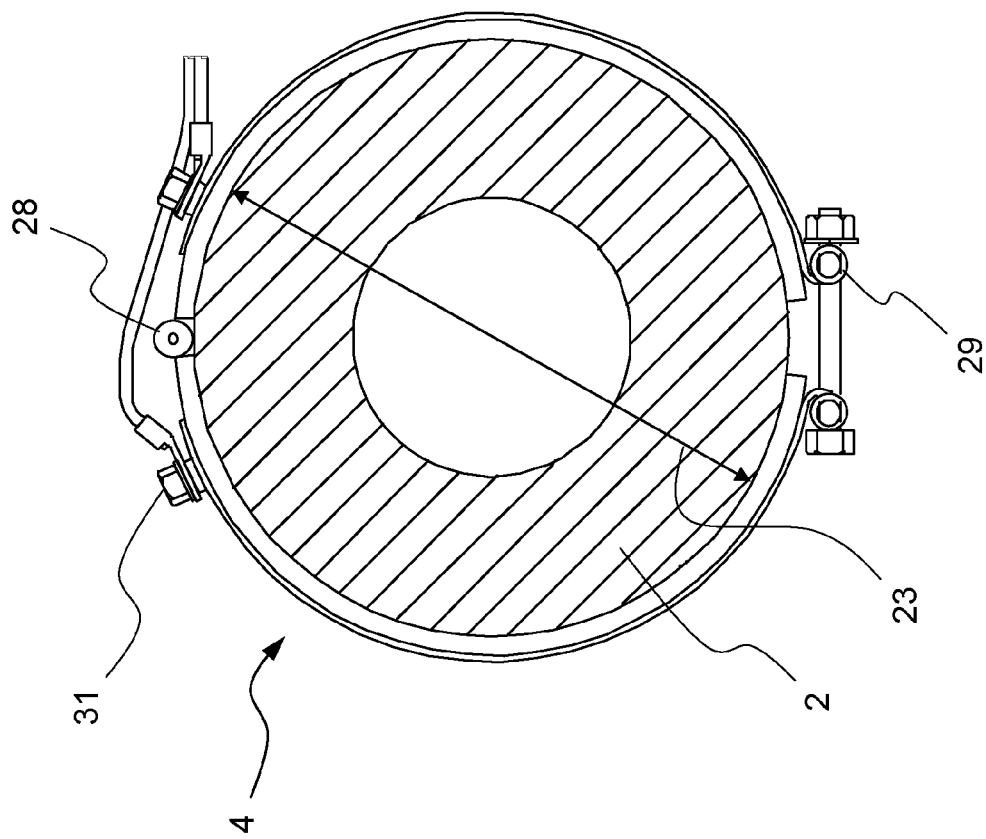
FIG. 4 is a sectional view taken along lines IV-IV of the plasticating barrel shown in FIG. 1 with conventional external resistive heaters typically referred to as band-heaters.

Roller applications (such as those described in U.S. Pat. No. 6,285,006 B1) require extremely uniform heat generation across the width of the roller and around its circumference (in order to produce sheets with sufficiently uniform properties in both the cross-direction and machine-direction). By comparison, heating of plasticating elements such as barrels does not require extreme uniformity, as evidenced by the design of conventional band-heaters. Referring now to FIGS. 1 and 4, there are gaps 27 between band-heaters 4, and they typically incorporate features such as hinges 28 and latches 29 so they can be tightened around the heated element (i.e. barrel 2) to reduce the contact heat-transfer resistance between them. In practice, the resulting contact pressure is not entirely uniform, so the heating rate varies over the band-heater's length 30 and around its circumference 31. Also, the resistive heating element embedded within the band-heater 4 cannot extend all the way around its circumference, so there is no heat generation in the immediate vicinity of the band-heater's electrical terminations 31 and fastening components, such as its hinges 28 and latches 29. By comparison, the present invention's preferred use of a spiral striped heater layer will produce inherently more uniform heating due to the continuous spiral path along the length of the zone 5 and around the circumference 31 of the heated element 2.

Figure 3:
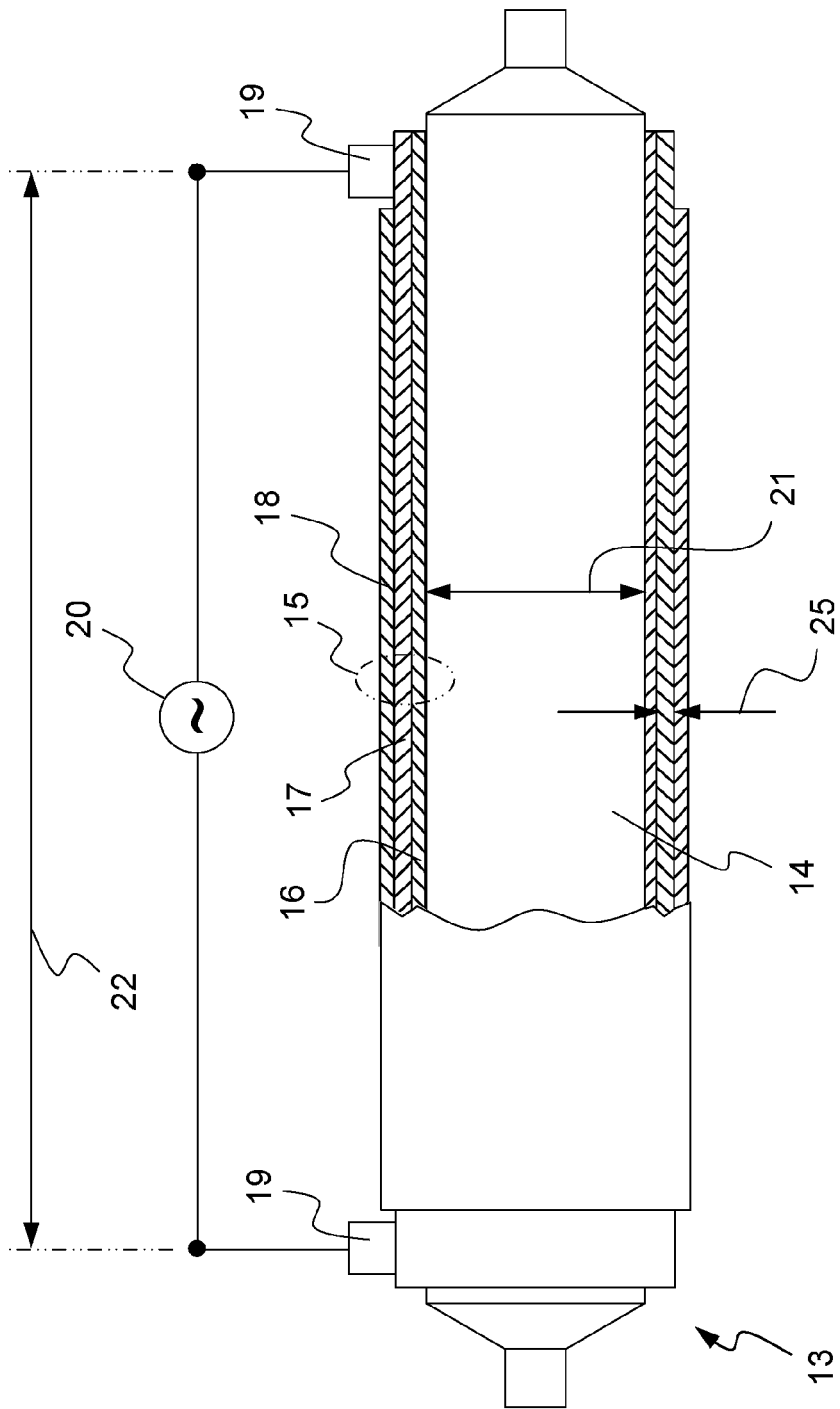
FIG. 3 is a partial sectional side-view of a roller equipped with break-aways to show parts of a laminated ceramic coating (coating layer dimensions are enlarged for clarity) to provide resistive heating of the roller.

Referring now to FIG. 3, to maximize heating uniformity the external surfaces of rollers 13 used for sheet manufacturing or conversion are generally intentionally unobstructed, so gaps in the heater layer 17 are typically not required to accommodate obstructions. Roller heated widths 22 are also relatively large compared to their diameter 21, so their end-to-end electrical resistances are relatively high for a given range of ceramic heater layer thickness 25. Therefore, spiral striping of the heater layer 17 is generally not needed or desirable on roller applications for the various reasons listed above.

Referring again to FIGS. 1 and 4, on most cylindrical plasticating elements 2 the ratio of the zone length ("Lz") 5 to the element's outside diameter ("OD") 23 is relatively small, i.e. Lz/OD z≈1 to 3. Consequently, the voltage drop per axial length increment on cylindrical plasticating elements 2 (i.e. barrels) usually must be relatively large, thereby requiring a spiral heater layer path to produce a sufficient electrical resistance.

For all the various reasons described above, therefore, the use of spiral heater layer striping is much more appropriate and beneficial for the heating of cylindrical plasticating elements, as needed in this case.

Figure 2B:
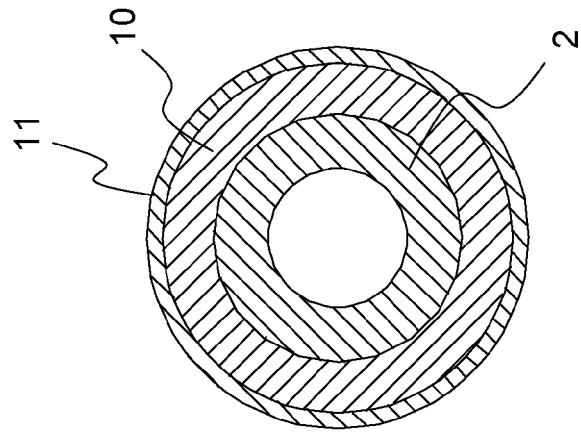
FIG. 2B is a sectional view of the plasticating barrel taken along lines II-II shown in FIG. 2A.

Referring again to FIGS. 1, 2A and 2B, cylindrical plasticating elements such as barrels 2 are conventionally heated by various means, including by resistive band-heaters 4 and AC induction coils 11. Band-heaters 4 can be particularly suited to use on small diameter sections such as nozzles 74, or on relatively short sections of different diameter, such as those commonly referred to in the art as barrel "heads" or "endbells" 75. The relatively small external surfaces of these shorter sections 74, 75 offer minimal energy savings potential, as well as minimal space for the present invention's electrical connections. AC induction can also be of unique advantage in the first zone 68 of an injection barrel (commonly referred to in the art as the "feed" zone) where maximizing the heat input rate can permit the throughput rate of the process to be increased. For the various reasons listed above, it can therefore be desirable to concurrently employ band-heaters 4 and/or AC induction coils 11 on the same cylindrical plasticating element 2 (i.e. injection or extrusion barrel) as the present invention. It is therefore an objective of the present invention to be able to concurrently use band-heaters 4 and/or AC induction coils 11 alongside the present invention on the same cylindrical plasticating element 2.

In the event an embodiment of the ceramic heating system fails during operation, it is also an objective of this invention to allow band-heaters 4 and/or AC induction coils 11 to be subsequently installed and operated in place without having to remove the ceramic heating system.

It is also an objective of the present invention to allow the superimposed use of a means for cooling cylindrical plasticating elements, such as air-cooling using blowers (fans) with surrounding sheet-metal shrouds, and also water-cooled jackets.

Figures 5A, 5B:
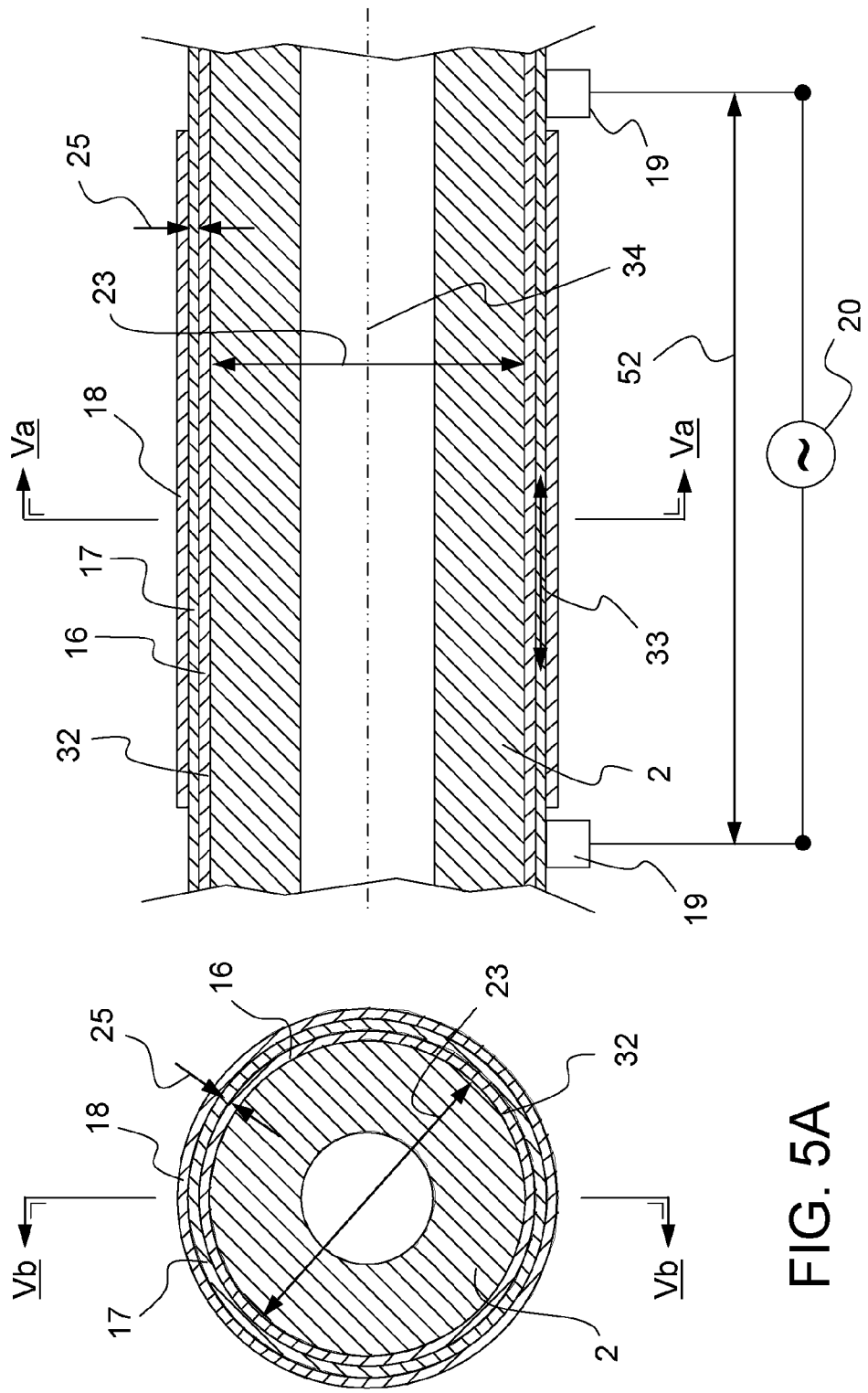
FIG. 5A is a sectional view taken along lines Va-Va of a plasticating barrel with a laminated ceramic coating in FIG. 5B to provide resistive heating of the plasticating barrel (coating layer dimensions are enlarged for clarity)
FIG. 5B is a sectional view taken along lines Vb-Vb of the plasticating barrel shown in FIG. 5A.

More specifically, referring to FIGS. 5A and 5B, a first preferred embodiment of the present invention utilizes a ceramic heater layer 17 of thickness 25 applied to the external surface 32 of a cylindrical plasticating element, such as a barrel 2, in order to heat the barrel 2. An electrical insulating layer 16 is applied between the ceramic heater layer 17 and the barrel 2. Another electrical insulating layer 18 may also be applied over the ceramic heater layer 17. Optional bonding layers (not shown) may be applied between any two layers, but they are typically not needed. The various layers 16, 17, 18 may be applied by multiple methods, including plasma spraying. In this first embodiment, electrical current 33 will flow longitudinally (along the axis 34 of the barrel 2) through the ceramic heater layer 17 between two longitudinally-spaced electrodes 19 that are connected to an external power source 20.

Referring now to FIGS. 5A, 5B, 6A and 6B, electrodes 19 can be constructed in various ways, including as rings 35 that clamp around the barrel 2 using hinges 36 and simple screw fasteners 37 that can be employed to both fix the electrodes 19 in place and terminate electrical wires 38 to an external power source 20. The external insulating layer 18 can also be applied in sections 39 in order to create exposed regions 40 of the heating layer 17, thereby allowing the electrodes 19 to make electrical contact with the heater layer 17. When the power source 20 is connected across paired electrodes 41, 42, a longitudinal electrical current 33 then flows through the heat layer 17. To facilitate separately controllable heating zones 43, the heater layer 17 can also be applied in sections 44 to create gaps 45 between adjacent zonal heater layers 17.

Referring still to FIGS. 5A, 5B, 6A and 6B, instead of the external insulating layer 18 and heater layer 17 being applied in sections 39, 44 as described above, they can also be applied contiguously, and then sections of them removed by a suitable method such as machining or grit blasting to produce the exposed regions 40 and gaps 45.

Referring again to FIG. 5A, the surface of one or more layers 16, 17, 18 can be coated, chemically treated or mechanically finished to improve characteristics such as adhesion or resistance to contamination, but these added steps are typically not needed. Additional functional external layers (not shown) can also be applied without altering the spirit or scope of the invention. For example, referring now to FIG. 6B, a highly-conductive layer (not shown), can be applied by suitable means (such as spray coating of molten copper) as a narrow strip in the exposed region 40 over top of the heater layer 17 in order to improve the electrical contact between the electrode 19 and the heater layer 17.

Figures 6A, 6B:
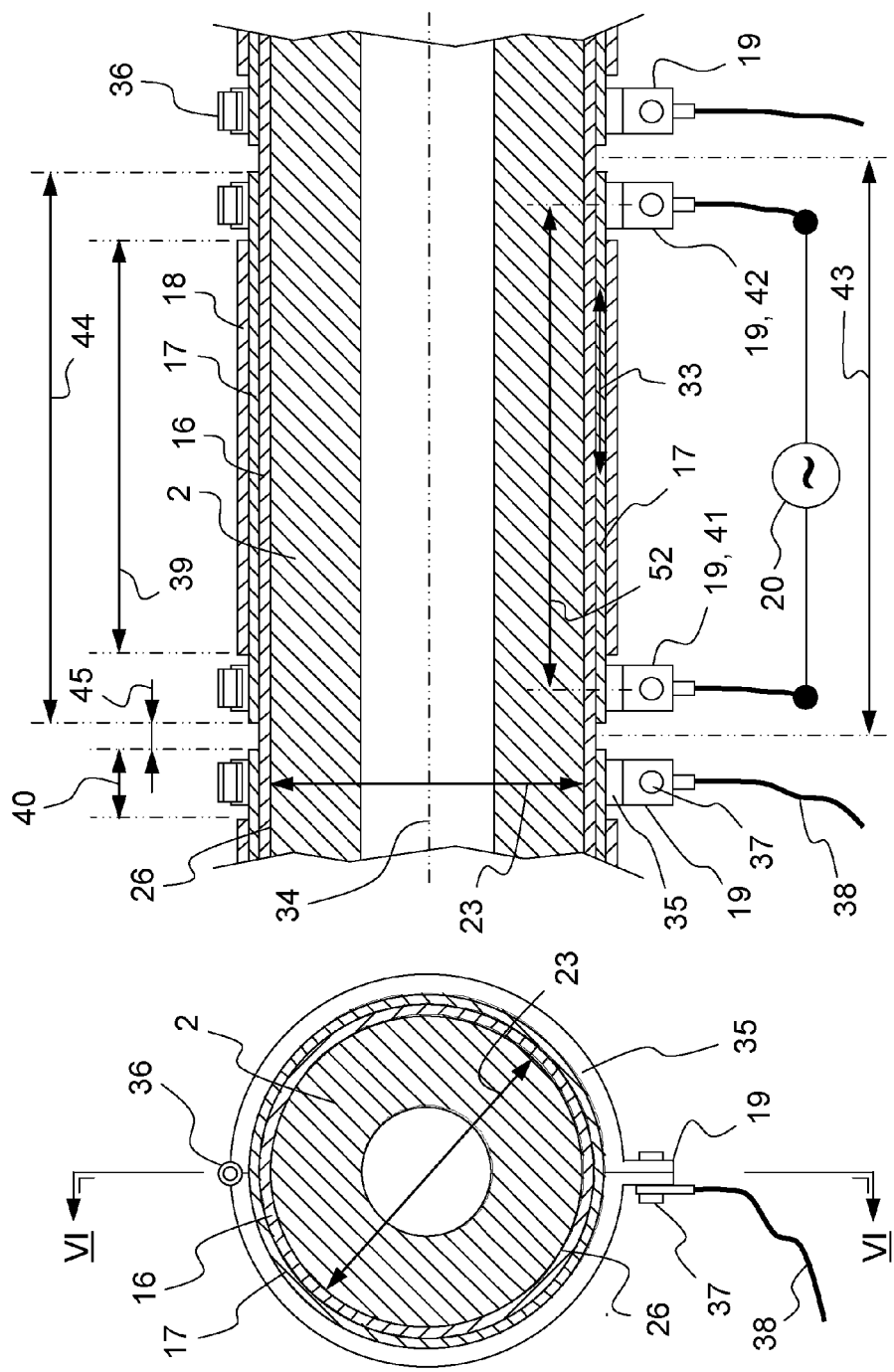
FIG. 6A is a sectional view of the plasticating barrel shown in FIG. 5A, with the addition of ring-shaped electrodes (coating layer dimensions are enlarged for clarity)
FIG. 6B is a sectional view taken along lines VI-VI of the plasticating barrel shown in FIG. 6A.

It should also be understood that the designs of the electrodes 19 illustrated in FIGS. 6A and 6B are merely representative and that many suitable electrode designs can be envisioned within the scope of this invention. It should also be understood that while plasma spraying is the readily envisioned manner in which the layers 16, 17, and 18 are applied, other methods of application would also fall within the spirit of the invention.

As illustrated next in FIGS. 7A and 7B, a cylindrical plasticating element (such as a barrel 2) having an external laminated ceramic coating 15 (comprising the functional layers 16, 17, 18 described previously) can then be easily thermally insulated with one or more wrapped layers of flexible insulation 46, such as Superwool 607™ insulating sheet manufactured by Thermal Ceramics, Inc., a division of the Morgan Crucible Company plc, (having its main office Thermal Ceramics de France S.A.S., 5 boulevard Marcel Pourtout, F-92563 Rueil-Malmaison Cedex, France at boulevard Marcel Pourtout, F-92563 Rueil-Malmaison Cedex, France) or alternatively with a cylindrical rigid sleeve of molded insulating material 46 such as can be vacuum-formed using a mix of Superwool 607 fiber and a suitable binder. Wrapping the hot external surface 26 of the ceramic coated barrel 2 can then virtually eliminate heat losses from the heated barrel 2 to the surrounding ambient environment.

Figure 8B:
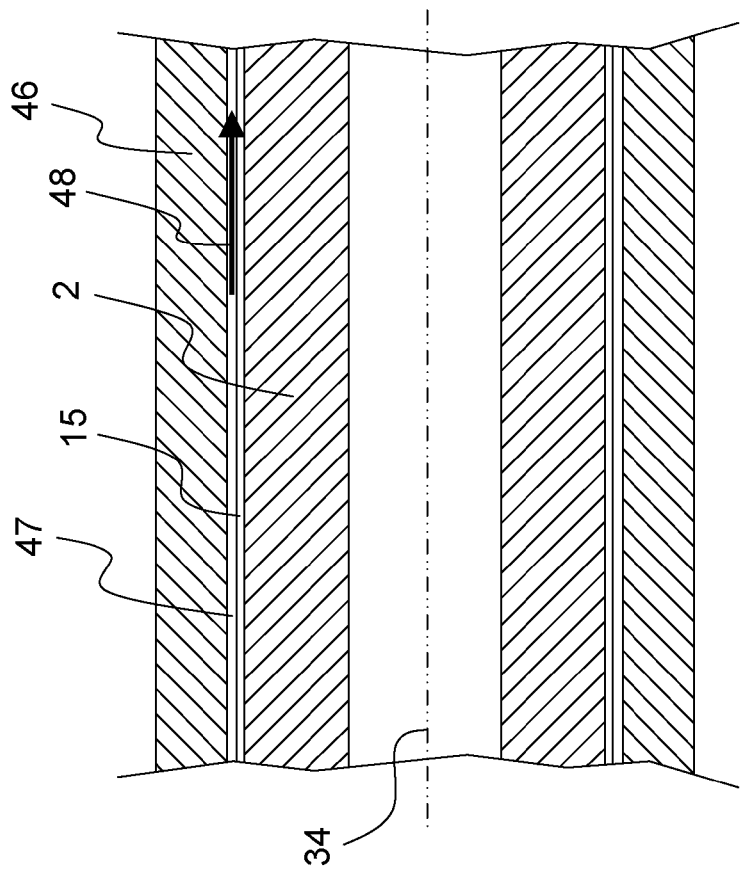
FIG. 8B is a sectional side-view taken along lines VIII-VIII of the plasticating barrel shown in FIG. 8A.
Figure 8A:
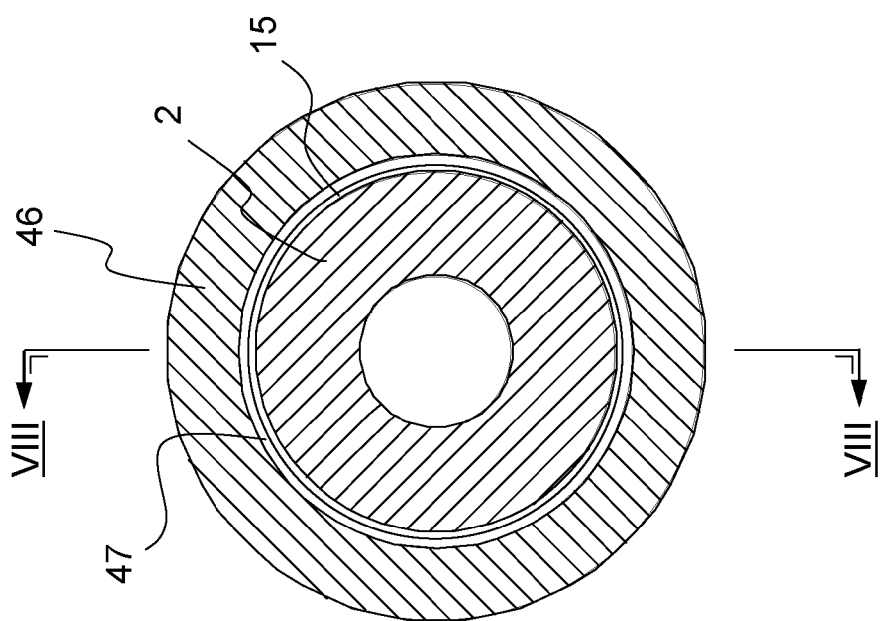
FIG. 8A is a sectional end-view of the plasticating barrel shown in FIG. 7A, with the addition of an annular gap between the external thermal insulating layer and the barrel.

In addition, as shown in FIGS. 8A and 8B, a sufficiently rigid and adequately supported thermal insulating sleeve 46 can also be used to form an annular gap 47 between itself and the ceramic coating 15, thereby allowing the passage of cooling air 48 between the sleeve 46 and the barrel 2, wherein said cooling air 48 can be forced through the annular gap 47 under pressure or drawn through it by means of an applied vacuum. The purpose of this cooling air flow 48 is to either facilitate steady-state cooling of the barrel 2 during production, as is often needed on extruders in certain zones, or to reduce the temperature of the barrel 2 when needed, as is sometimes necessary on both extruders and injection molding machines following planned or unplanned process disturbances.

As discussed in the "Summary of the Invention," differences between the coefficient of thermal expansion ("CTE") of a ceramic coating, such as a plasma-sprayed titanium dioxide ("titania") coating, and that of steel (the material normally used for cylindrical plasticating elements such as barrels), result in tensile stresses in the ceramic coating. Referring again to FIGS. 5A through 8B, preferred embodiments of the present invention, therefore, use a ceramic-metal mix for the heater layer 17 commonly referred to as "cermet" (discussed in detail below), to better match the CTE of the heater layer 17 to that of the underlying steel element 2.

When a typical ceramic coating such as titania is used as a heater layer 17 on a cylindrical plasticating element 2, the tensile stress in the titania increases as the temperature increases, because the ceramic layer 17 does not expand as much as the underlying steel 2. Plasma-sprayed ceramic coatings can withstand very high stresses in compression but are weak in tensional stress, with an ultimate elongation of only about 1%. At increasing temperatures, the stresses developed in the titania coating cause increased micro-cracking of the heater layer 17. This micro-cracking reduces the number of available electrically conductive pathways in the heater layer 17 and permanently increases the electrical resistance of the coating 17. In the 300° F. to 400° F. range, this increase in electrical resistance is minor, but in the 500° F. to 600° F. range, it is significant, and can increase the electrical resistance of the coating 17 by more than 50% after just a few thermal cycles, i.e. heating from ambient (approximately 70° F.) to >500° F. then allowing the temperature to cool back down before repeating the cycle.

One way to reduce thermally-induced tensile stresses in the heater layer 17 to prevent or minimize micro-cracking, is to blend the ceramic (such as titania) with a suitable material (ductile metals preferred) that has a significantly higher CTE value. When metal is used, the resulting ceramic-metal formulation is commonly referred to as a "cermet". Use of a cermet increases the CTE of the heater layer while the metal component lends ductility to the blend to further reduce micro-cracking. The cermet's metal particles also interrupt the structure of the titania to spread out the remaining thermal stresses.

In Table 2, the CTE values of various ceramics and metals are listed, along with that of a suitable cermet blend. Referring again to FIGS. 5A through 8B, alumina and zirconia are typically used for the electrical insulating layers 16, 18, while titania is a particularly suitable ceramic component for the heater layer 17.

TABLE 2

Coefficients of Thermal Expansion

| Material | CTE ($10^{-6}$ in/in/° F.) | 100% Density | Parts | Volume | Volume Fraction | Bulk CTE ($10^{-6}$ in/in/° F.) |
|---|---|---|---|---|---|---|
| Alumina 95% | 4.3 | 3.7 | | | | |
| Alumina 99% | 4.7 | 3.7 | | | | |
| Titania | 5.0 | 4.6 | 49 | 10.65 | 0.64 | 3.2 |
| Zirconia 8% Yttria | 5.6 | 6.0 | | | | |
| Various Steels low | 6.2 | 7.8 | | | | |
| Various Steels high | 6.7 | 7.8 | | | | |
| Mild Steel | 6.7 | 7.9 | | | | |
| Nickel 200 | 7.4 | 8.9 | | | | |
| 80/20 Nickel Chrome | 9.6 | 8.4 | 51 | 6.06 | 0.36 | 3.5 |
| Totals | | | | 16.72 | | 6.7 |

Referring still to Table 2 and FIGS. 5A through 8B, the CTE of a 100% titania heater layer is approximately 5.0 micro-inches per inch of length per ° F., compared to about 6.7 for mild steel. As seen in Table 2, 49% titania and 51% percent (by weight) of an 80/20 nickel chromium (NiCr) steel alloy are blended to produce a plasma-sprayed heater layer with a bulk CTE approximately equal to that of mild steel. It is not necessary to exactly match the CTE of the steel element 2 to produce a sufficient improvement in the micro-cracking resistance of the heater layer 17 (in order to sufficiently stabilize the electrical resistance throughout thermal cycles). A cermet consisting of 30% by weight of nickel and 70% of titania provides a CTE of about 5.5 that produces a significant improvement in the stability of the electrical resistance compared to that of 100% titania with a CTE of 5.0. Notably, the CTE value of this 30/70 blend is relatively low because the CTE of nickel is significantly lower than 80/20 NiCr. It is also possible to produce a blended cermet heater layer 17 that has a higher CTE than the underlying steel element 2, such as, for example, 35% titania and 65% NiCr. This would theoretically put the heater layer 17 into compression at elevated temperatures. As illustrated in Table 2, the bulk CTE value of the blended cermet heater layer 17 is calculated by converting the weights of the constituents into volumes. By calculating the volume fraction of each material in the blend, the CTE of the mixture can be calculated. For example, if the volumes of the ceramic and metal were equal, they should contribute equally to the final CTE values.

Figure 9:
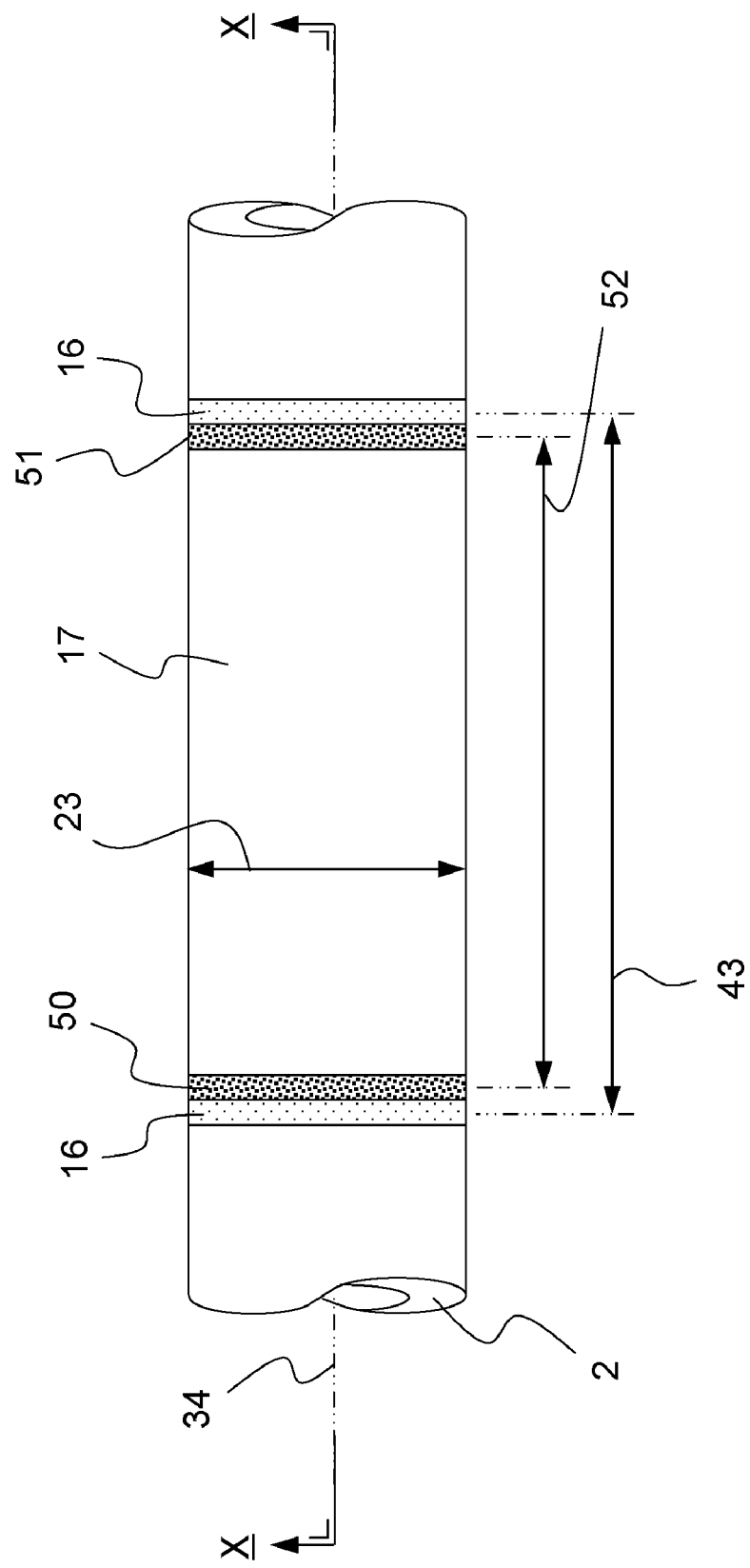
FIG. 9 is a side elevational view of a plasticating barrel with a laminated ceramic coating (external electrical insulating layer not shown for clarity)
Figure 10:
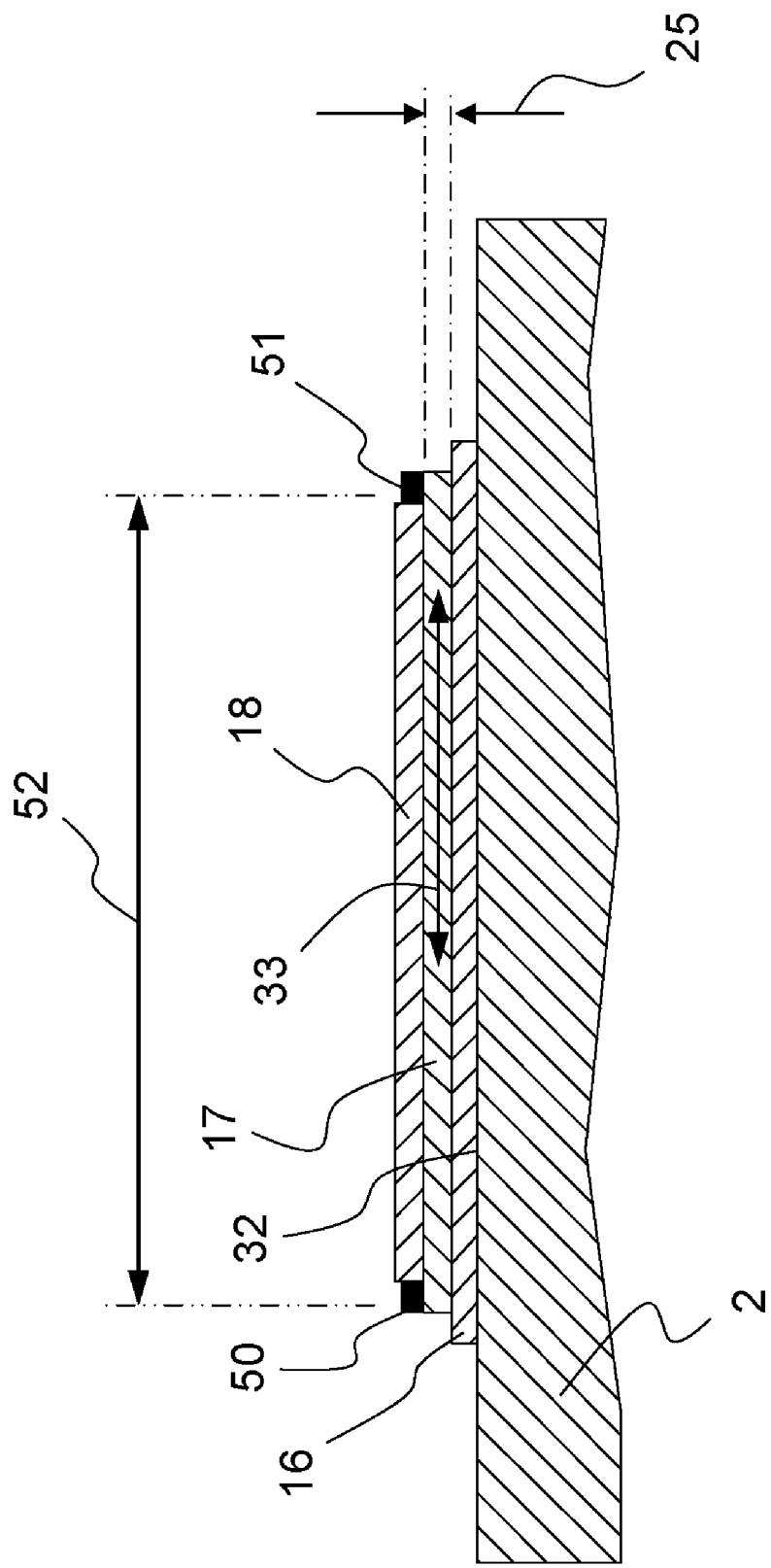
FIG. 10 is a partial sectional view of the laminated ceramic coating (layer dimensions enlarged for clarity) taken along line X-X in FIG. 9, used to heat the plasticating barrel shown therein.

As summarized previously, a preferred embodiment of the invention uses spiral striping of the heater layer to increase its electrical resistance. Referring now to FIGS. 9 and 10, a ceramic heater layer 17 applied over top of an insulating layer 16 (for clarity, the exterior electrical insulating layer 18 is not shown in FIG. 9, but is shown in FIG. 10) to a cylindrical plasticating element 2, essentially forms a tube having a wall thickness 25 of only a few mils thick that can then be portrayed as an unraveled, flattened heater layer sheet 49 as shown in FIG. 11.

Figure 11:
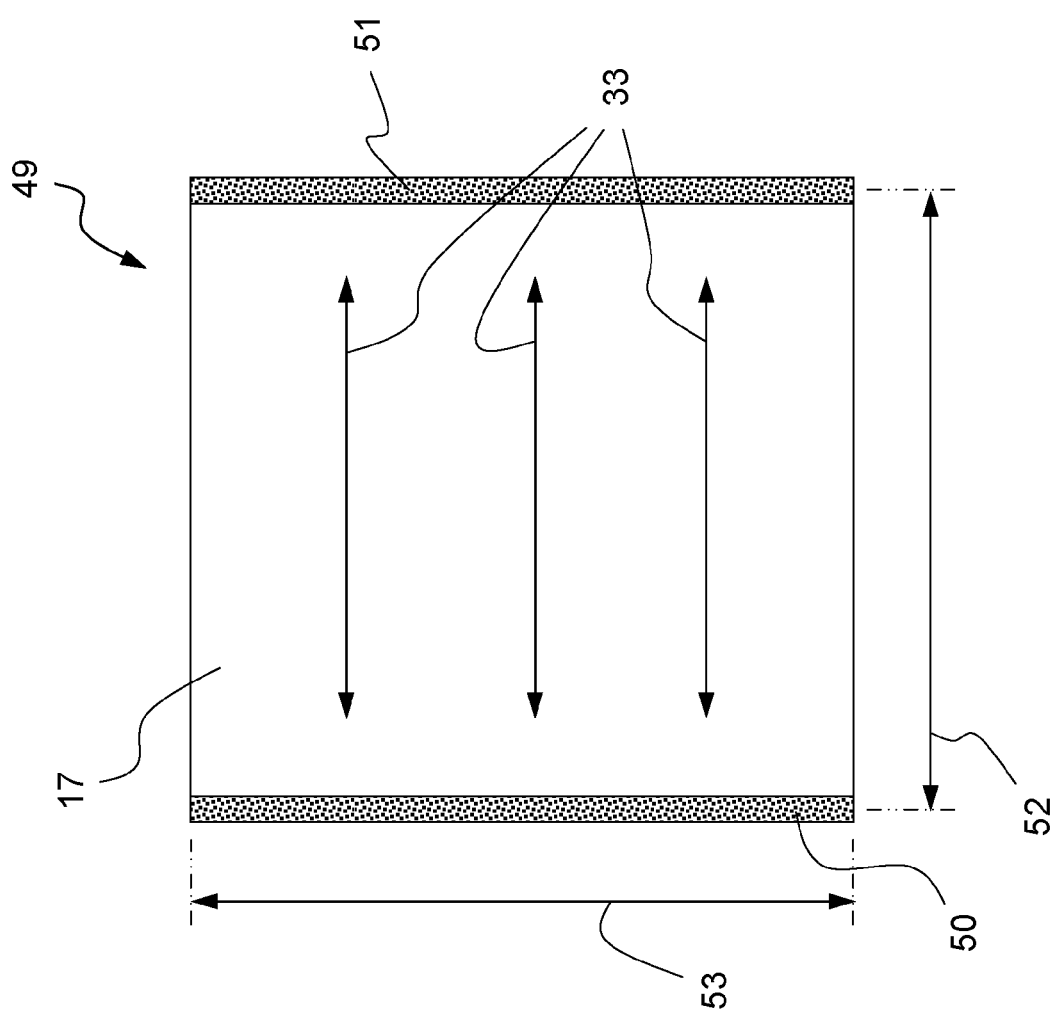
FIG. 11 is an unraveled, surface layout of the laminated ceramic coating used to heat the plasticating barrel shown in FIG. 9.

Referring still to FIGS. 9, 10 and 11, as well as to FIGS. 5A through 6B, on each end of the heater layer 17 narrow electrode bands 50, 51 of a highly-conductive sprayed metal (i.e. copper) can also be applied to form particularly low-resistance surfaces that will eliminate the possibility of arcing between the heater layer 17 and the subsequently installed power supply electrodes 19. Normally, the voltage drops by 5-15 volts per inch of distance between the electrode bands 50, 51 of a plasma-sprayed titanium dioxide (titania) ceramic heater layer 17 that is 1-2 mils thick. For example, referring to FIG. 3, on a typical laminator roller 13 that is 8 inches diameter and 32 inches long, with a heater layer 17 that is 31 inches long, the power supply voltage 20 connected between the electrodes 19 is about 240 volts, resulting in a voltage drop per inch of heated roller width 22 of about 8 volts.

Referring still to FIGS. 5A through 6B, and 9 through 11, on a cylindrical plasticating element 2 such as a barrel, the lengths 43 of the temperature control zones are typically only about two times the outside diameter 23 of the barrel 2, even though the applied voltage 20 may be up to nearly 600 volts (i.e. in Canada). This results in a voltage drop of up to 40-50 volts per inch of distance 52 between electrodes 19 (or electrode bands 50, 51). To compensate for this relatively high voltage drop and limit the current flow 33 between the electrodes 19 (or electrode bands 50, 51) to a reasonable level, the electrical resistance of the heater layer 17 needs to be raised, which can be achieved by reducing its thickness 25. For a titania heater layer 17 with a nominal 2 mil thickness, this means its thickness 25 must be further reduced by at least 4 times. However, ceramic heater layers less than 1 mil thick are not practical from a manufacturing control or reliability point of view.

Figure 12:
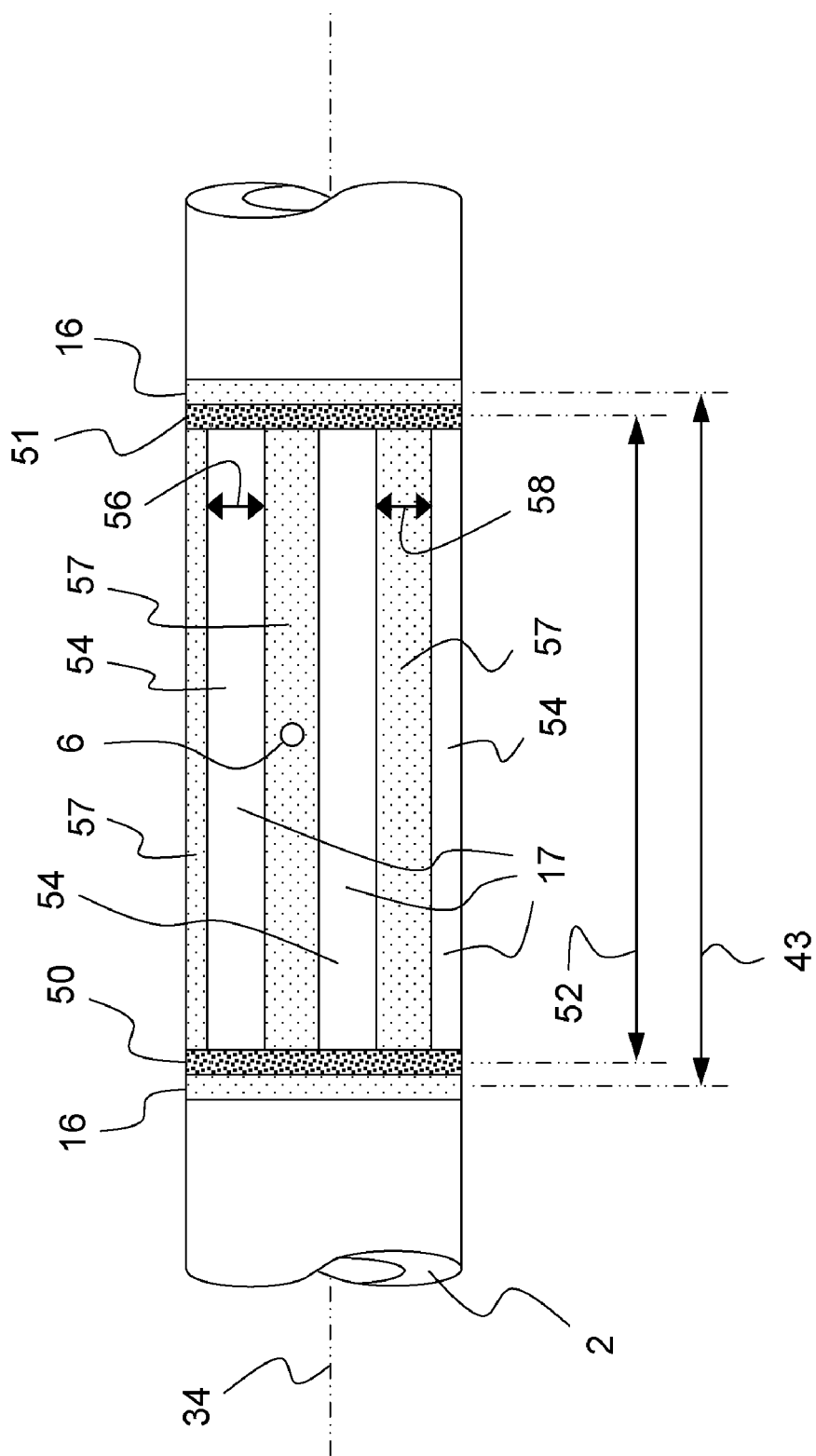
FIG. 12 is a side elevational view of the plasticating barrel shown in FIG. 9, with the laminated ceramic coating consisting of axial heater stripes.

Referring now to FIGS. 11 and 12, one alternative is to make the heater layer thickness 25 in the normal range (i.e. ≧2 mils thick), but to decrease the effective flow path width 53 of the electrical current 33 between the electrode bands 50, 51 by employing multiple axial heater layer stripes 54 parallel to the axis 34 of the barrel 2. By reducing the effective flow path width 53 of the heater layer 17, the total electrical resistance of the heater layer 17 is increased. The non-conductive gaps 57 between the heater layer stripes 54 can then be used to accommodate obstructions such as thermocouple holes 6. The multiple axial heater stripes 54 are then typically electrically connected in parallel by the electrode bands 50, 51 and the widths 56 of the heater stripes 54, and the widths 58 of the intervening gaps 57, are then sized to produce the desired electrical resistance between the electrode bands 50, 51.

Referring now to FIGS. 9 and 12, the use of axial heater stripes 54 (as shown in FIG. 12) is an improvement over that of a contiguous heater layer 17 (as shown in FIG. 9). However, referring now to only FIG. 12, with axial heater layer stripes 54 there is still a key limitation, which is that the length of the current flow still cannot be increased beyond that of the distance 52 between the electrodes 50, 51.

Figure 13:
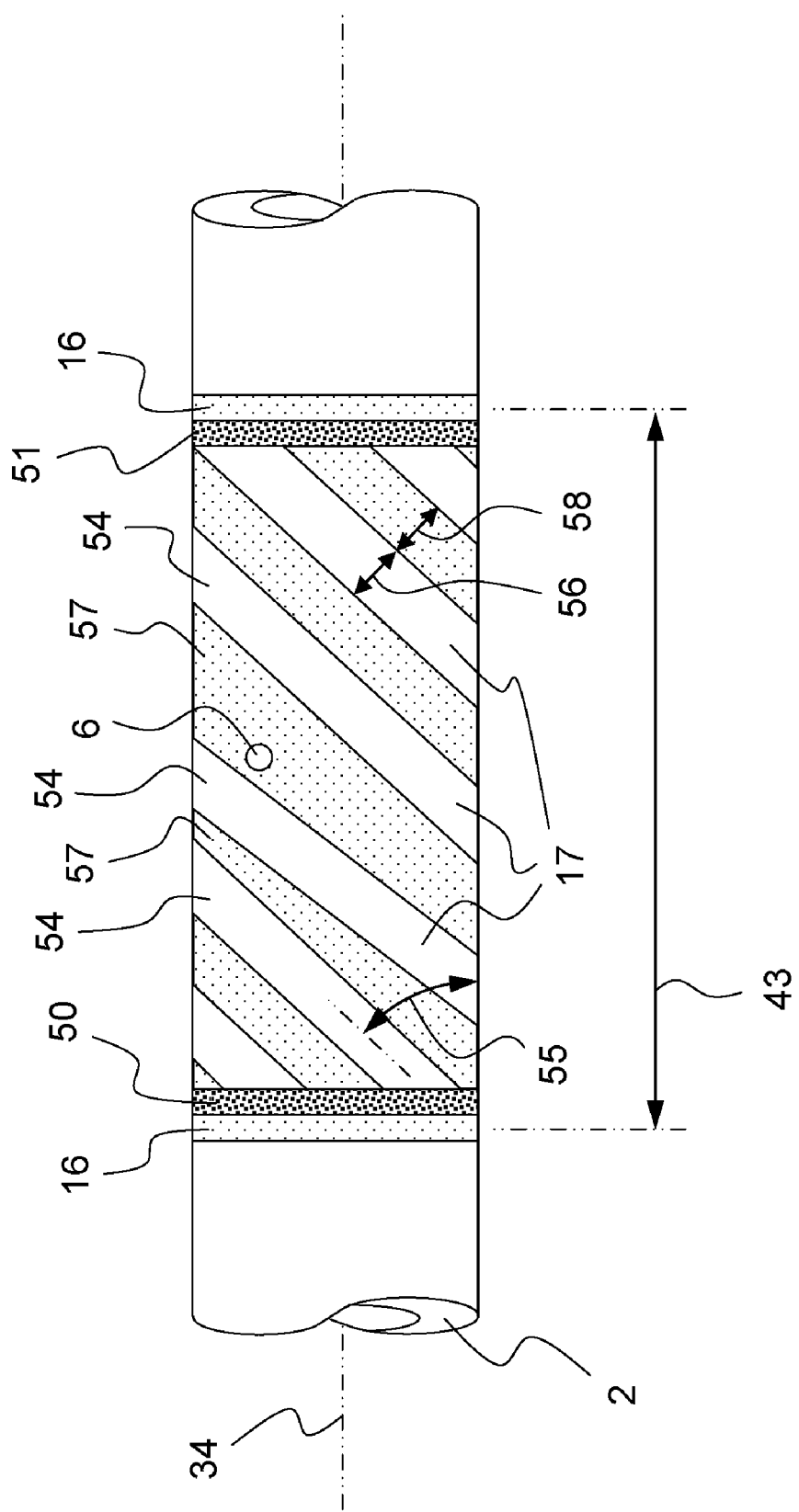
FIG. 13 is a side elevational view of the plasticating barrel shown in FIG. 9, with the laminated ceramic coating consisting of spiral heater stripes.

Referring now to FIG. 13, a further enhancement is then to increase the current flow path length between the electrode bands 50, 51 by spiraling the heater layer stripes 54 (as few as one spiral heater stripe may be used) with helix angles 55 around the barrel 2. Multiple spiral heater stripes 54 are then typically electrically connected in parallel by the electrode bands 50, 51 and are typically of equal widths 56 with gaps 57 of minimum width 58 between them. Series or series/parallel connections between multiple heater stripes 54 can also be envisioned as can different stripe widths 56 and gap widths 58.

Striping of a sprayed heater layer on a roller is described in U.S. Pat. No. 6,596,960 B1 using a masking approach during thermal spraying of the heater layer. However, referring again to FIGS. 10, 11, 12 and 13, the use of heater layer striping, and more so, spiral striping, is particularly relevant and beneficial on a cylindrical plasticating element 2, for multiple reasons, including;

the ability to adjust the pitch or helix angle 55 of the heater stripes 54 and the width 58 of the gaps 57 between them to bypass obstacles, such as thermocouple holes 6 and mounting holes for barrel covers and supports, etc.

allowing the heater layer thickness 25 to be increased, thereby making it easier to apply consistently and making its electrical resistance more predictable.

allowing the helix angle 55 of the spiral heater stripes 54 to be adjusted to maintain a reasonable heat generation density (i.e. approximately 2 watts/cm$^2$) across a wide range of supply voltages. This versatility is needed to permit the invention's application around the world in a wide range of electrical environments (i.e. from a low of about 100V in Japan to a high of about 600V in Canada).

improving the reliability of the heater layer 17 by providing redundancy. With multiple stripes 54, if one suffers a failure (i.e. due to cracking, arcing, physical damage, etc.), the failure will typically be limited to a single stripe. That stripe will cease to heat but the other stripes 54 will continue to carry current and provide heating of the barrel 2. For example, if one stripe 54 out of eight fails, the power consumption and heat generation rate is only reduced by 12.5%.

the ability to power each stripe 54 separately, for even greater redundancy and controllability. Referring now to FIG. 13, the examples below assume that all stripes 54 are the same length 52 and width 56 and are electrically connected as resistors in parallel. In reality, each stripe 54 can be powered and fused separately, if desired, giving an extra layer of safety, reliability and power control. For example, half the stripes 54 can be turned off completely for a half-power application with minimal effect on overall temperature uniformity, allowing the remaining stripes 54 to be held in reserve in case of failures.

The benefits of heater-layer spiral striping and how it can be optimized can be better understood by the following discussion:

Spiral stripe widths and lengths. Referring again to FIGS. 9 and 11 where the heater layer 17 is represented as an unraveled, flattened sheet 49, assume that the heated zone of a plasticating barrel 2 with a 10 inch distance 52 and 10 inch circumference 53 has a heater surface area of 100-square inches and an electrical resistance between electrode bands 50, 51 of 1 ohm.

The surface resistivity of this heater layer sheet 49 is therefore, 1.0 ohm per square. The resistance of any other size square (1×1, 1.36×1.36, 2×2, 5×5, 10×10 inches, etc.) using the same heater layer material and thickness will also be 1.0 ohm. This is because the width 53 of the electrical current path increases at the same time as the length 52 of the current path, thereby resulting in no net change in the electrical resistance. This feature is useful for calculating heater layer stripe lengths and resistances as described below.

Figure 14:
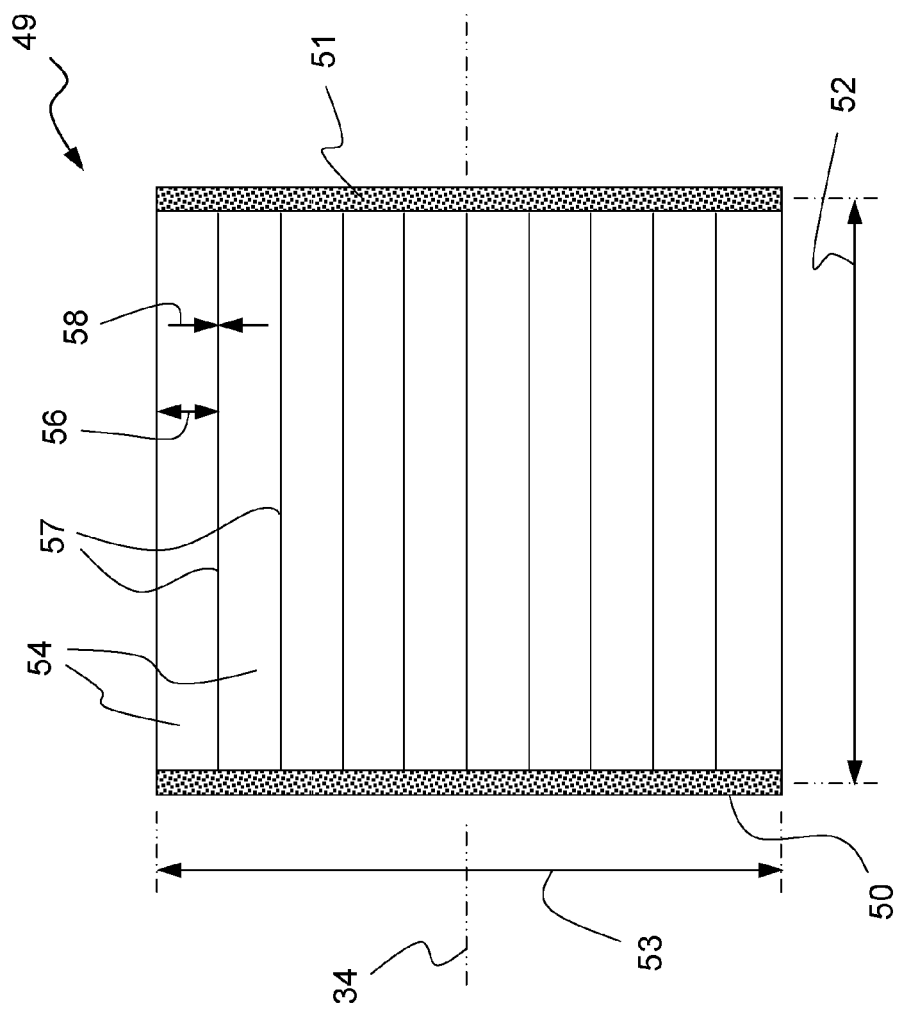
FIG. 14 is an unraveled, surface layout of the laminated ceramic coating used to heat the plasticating barrel shown in FIG. 12.

As illustrated next by comparing FIGS. 11 and 14, cutting the heater layer sheet 49 into ten stripes 54 of 1 inch width 56 with 10 inch length 52 has no effect on the overall electrical resistance of the zone (assuming the gaps 57 between the heater layer stripes 54 have an infinitely narrow width 58). The resistance of each 1×10 inch stripe 54 will have a resistance of 10 ohms, and, therefore, the resistance of each square inch will be 1 ohm. The resistance of ten, parallel-connected 1×10 inch stripes 54 with resistances of 10 ohms each is therefore 1 ohm (10/10) based on the rules for equal resistances in parallel. Another way to look at this is that the resistance of a 1×1 inch square is 1 ohm, so ten 1×1 inch squares in series equals a total of 10 ohms for a 1×10 inch stripe 54.

Figure 15:
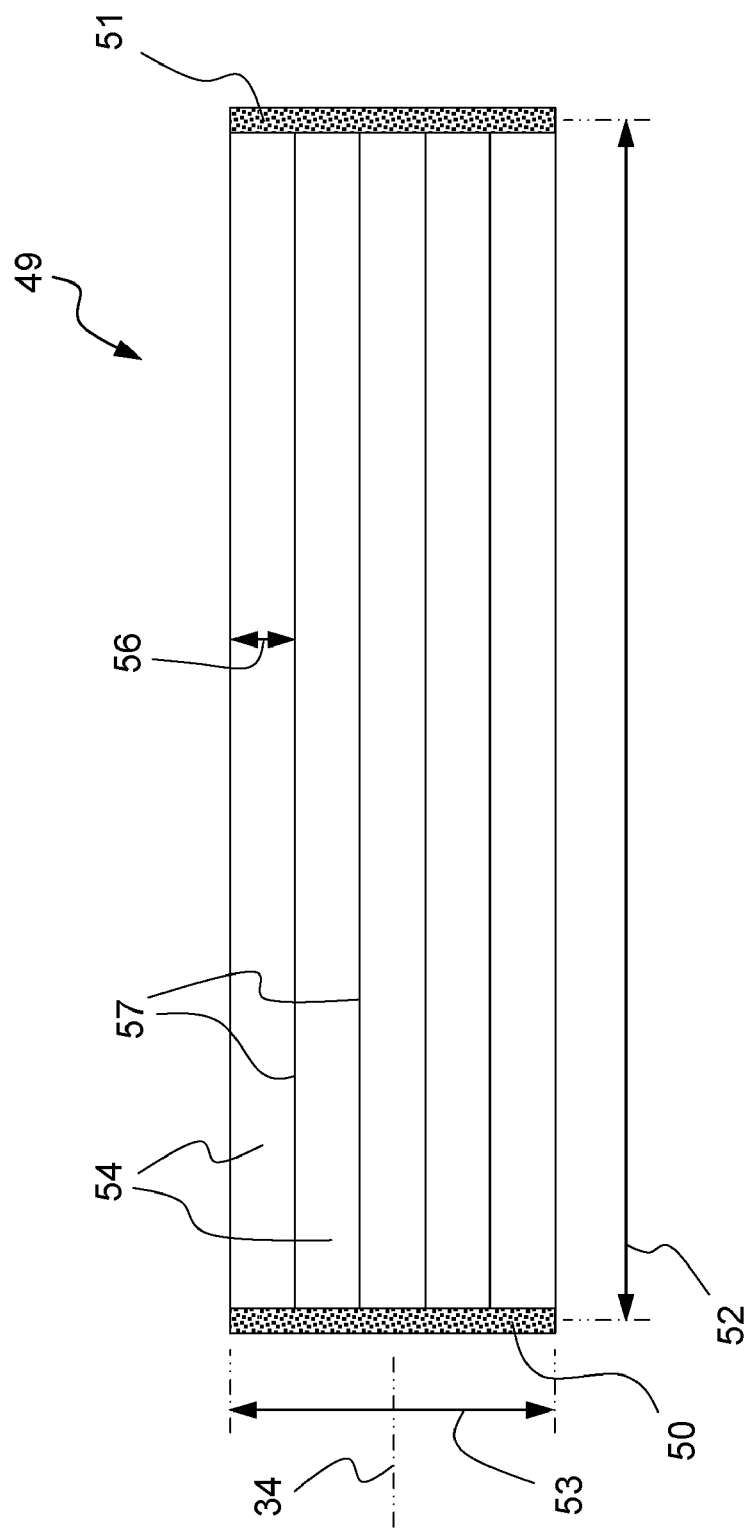
FIG. 15 is an elongated, narrowed layout of the heating layer shown in FIG. 14.

Referring now to FIG. 15, if the heater layer sheet 49 is rearranged into five heater layer stripes 54 of 20 inches length the electrical resistance of each 1×20 inch stripe 54 will be 20 ohms. A heater layer sheet 49 consisting of five 1×20 inch resistors in parallel will therefore total 4 ohms (20/5 or four 5×5 squares at one ohm each connected in series). The overall electrical resistance of the heater layer sheet 49 therefore increases with the square of the increase in stripe length 52 because the total area of the zone is fixed, and hence the stripe width 53 must decrease at the same rate as the stripe length 52 increases. Increasing the length 52 and decreasing the width 56 of the stripe 54 both work to increase the electrical resistance of the stripe 54.

Figure 16:
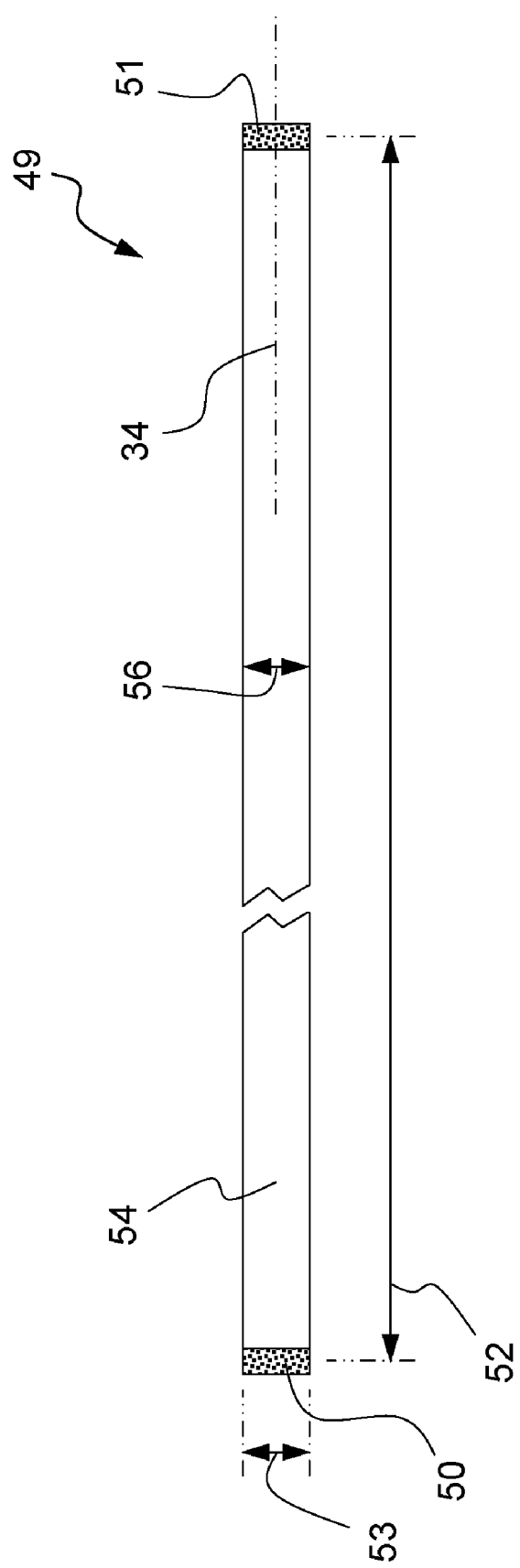
FIG. 16 shows the surface layout of a single heater layer stripe.

Referring next to FIGS. 13 and 16, if the heater layer sheet 49 is rearranged into one stripe 54 of 1 inch width 56×100 inch length 52, the resistance of the heater layer sheet 49 will total 100 ohms. This longer and narrower heater stripe 54 must therefore be spirally wrapped around the barrel 2 for it to fit within the shorter zone length 43. A heater layer stripe 54 of 100 inch length 52 will therefore have to make about ten rotations around the barrel 2 in a zone of only 10 inch length 43 (assuming infinitely narrow gaps 57 between the stripes 54).

The electrical resistance of the 10 inch×10 inch heater layer sheet 49 illustrated in FIG. 11 can therefore be increased by up to 100 times by converting it to a spiral stripe 54 of 1 inch width 56 wrapped up to 10 times around the barrel 2 (as illustrated in FIGS. 13 and 16). And, with even narrower stripe widths 56, even higher electrical resistances are possible.

Gaps between spiral stripes. Referring again to FIG. 13, the heater layer stripes 54 are formed by making gaps 57 in the heater layer 17. Realistic gap widths 58 range from as narrow as 20 mils to as wide as 0.5 inch or more. The width 58 of the gaps 57 is not particularly important, except that relatively wide gaps 57 will significantly reduce the overall surface area of the ceramic heater layer 17, requiring a higher heat generation density in the remaining area to achieve an acceptable overall heating rate.

Forming the spiral stripes. Referring now to FIGS. 10 and 13, the spiral stripes 54 of the heater layer 17 are preferably of equal width 56 to ensure uniform resistance and uniform heating, assuming the application of a common voltage to all the stripes 54. The heater layer 17 can be striped by masking during the thermal spray process, by using thermal spray tape, or wire or other metallic fixtures to prevent the heater layer 17 from adhering to the base insulator layer 16 at the selected gap locations. The gaps 57 between the heater layer stripes 54 can also be cut into the heater layer 17 after it is applied, using a narrow grinding or cut-off wheel, by tooling, or by grit blasting. The preferred striping method is by using a micro-grit blasting unit (or pencil blaster) such as is made by Comco Inc., Burbank, Calif., and Vaniman Manufacturing Co., Brandon Fallbrook, Calif., designed for processing jewelry and dental fixtures. These units can produce narrow channels 57 in the ceramic heater layer 17 as small as 20-30 mils in width 58. Because blasting leaves the ceramic surfaces textured and uncontaminated, additional ceramic sprayed over the heater layer 17 (such as a top insulator layer) will adhere properly. Very narrow gaps 57 between stripes 54 are possible because the voltage difference between the stripes at adjacent points (equal resistors in parallel) is typically only a few volts.

Calculation of stripe length and other factors. For calculating the appropriate stripe length, all of the required parameters are known (refer to FIGS. 5B, 6B, 11 and 13):

1) Zone applied voltage 20;
2) Heater layer ohms/square value (measureable function of material and thickness);
3) Desired wattage per square inch or centimeter;
4) Total zone amperage (maximum allowable); and
5) Heated zone area (distance 52×circumference 53, less the total area of the gaps 57).

Computing the heater layer as a single spiral heater stripe 54 should be done first. Selecting a value for the stripe length and gap width 58 then automatically determines the stripe width 56, stripe resistance, stripe amperage, stripe wattage, and watt density (watts per square inch or centimeter). Once the stripe length has been determined, the single stripe 54 can be divided into multiple narrower stripes compensating only for the area lost due to the gaps 57 between stripes 54.

Calculation errors in stripe resistance. Referring still to FIG. 13, the stripe(s) 54 are at a helix angle 55 to the axis 34 of the barrel 2, so the electrode bands 50, 51 are actually not perpendicular to the axis of the stripes 54.

Figure 17:
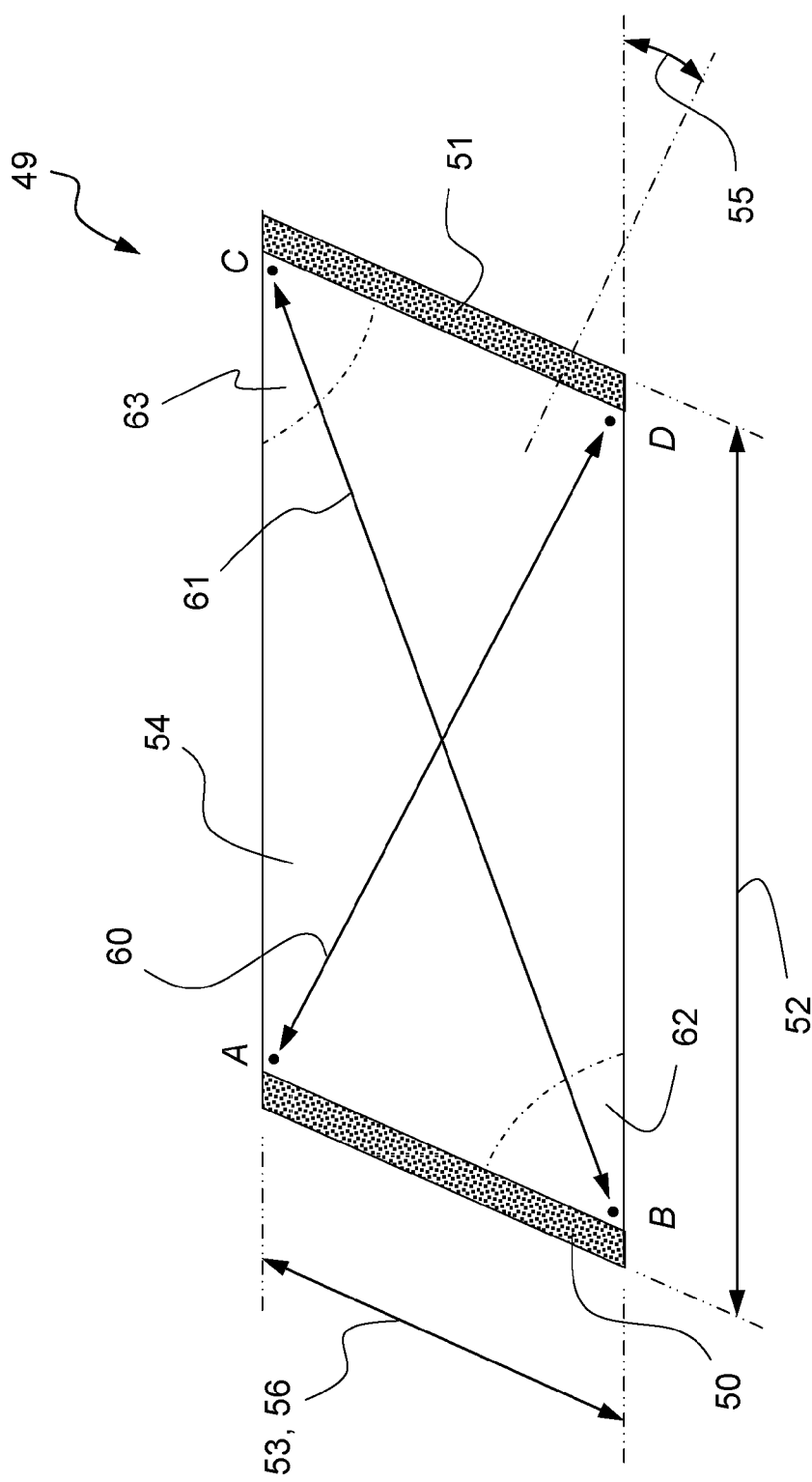
FIG. 17 is an unraveled, surface layout of a laminated ceramic coating showing the helix angle of a single heater stripe to the axis of a plasticating barrel.

FIG. 17 now provides an unraveled, flattened representation of a single wide heater layer stripe 54, showing the helix angle 55 between it and the barrel axis 34 (which is perpendicular to the electrode bands 50, 51). It is apparent from the flattened representation in FIG. 17 that asymmetric current flow paths are created, whereby the current path 60 from A to D is shorter than the current path 61 from B to C. Accordingly, less electrical current flows along the long path 61, producing less heat generation in the vicinity of points B and C, resulting in relatively cooler regions 62, 63. This geometry problem also causes the measured electrical resistance between the electrode bands 50, 51 to be ten or more percent lower than the calculated resistance based on the surface resistivity (ohms per square) value of the ceramic heater layer, and thus also causes the current flow to be higher than expected.

Figure 18:
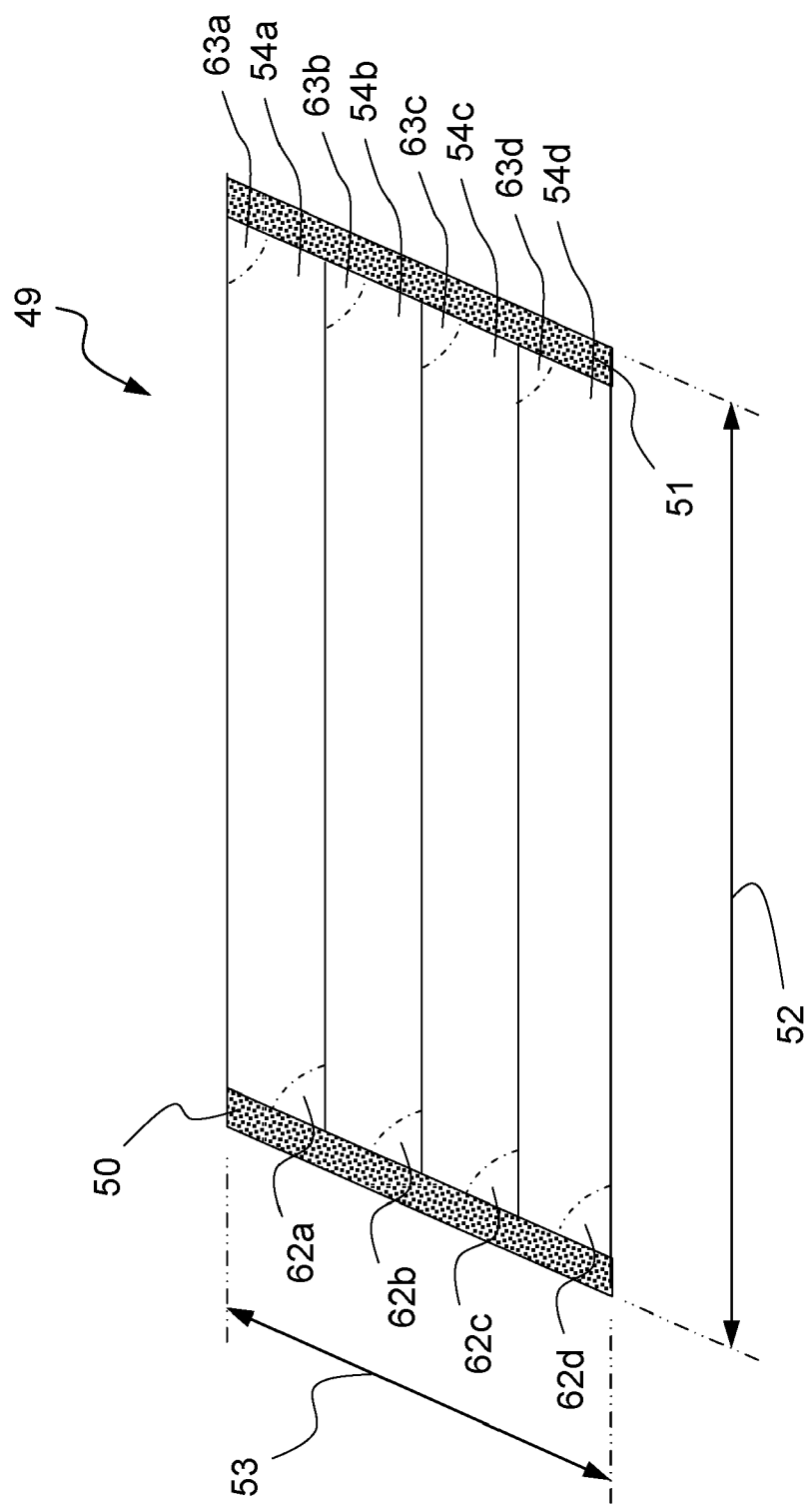
FIG. 18 is an unraveled, surface layout of a laminated ceramic coating having multiple spiral heater stripes.

Improved temperature uniformity with multiple stripes. By dividing the wide stripe 54 shown in FIG. 17, into several narrower stripes 54a through 54d as illustrated in FIG. 18, the cooler areas 62a through 63d are still present but are much smaller in area and more distributed around the circumference 53 of the barrel. The temperature uniformity throughout the heated zone is therefore much improved.

Routing stripes around obstacles. Referring now to FIGS. 1 and 10, cylindrical plasticating elements such as barrels 2 typically have at least one thermocouple temperature sensor ("TC") 6 per zone 5, typically installed in $3/8^{th}$ inch (NPT threaded) holes. There may be other discontinuities in the external surface 32 of the barrel 2 that must be circumnavigated by the heater layer 17. The thermally-sprayed internal insulator layer 16 will extend nearly to the edge of the TC hole 6, but the heater layer 17 must be masked for at least ¼ inch away from the edge of the TC hole 6 to prevent the electrical current from arcing to ground. This makes the area to be avoided by the heater layer 17 significantly larger than the actual TC hole 6.

As illustrated next in FIG. 19A, if the TC hole 6 lies within a single narrow stripe 54 the narrowed areas 64, 65 of heater layer remaining on either side of the TC hole 6 will carry the entire current flow 33 and so will likely overheat. The same situation is true to a lesser extent if the TC hole 6 is straddled by two stripes 54a, 54b as illustrated in FIG. 19B. The way to minimize this potential overheating problem is to spread the current flow 33 over a merged, larger area 66, as illustrated in FIG. 19C. With this approach multiple heater layer stripes 54a-54c are merged into a shared heating layer area 66 in the immediate vicinity of the TC hole 6. Of course, for this method to work, the stripes 54a-54c must be connected as parallel resistors.

Figure 20:
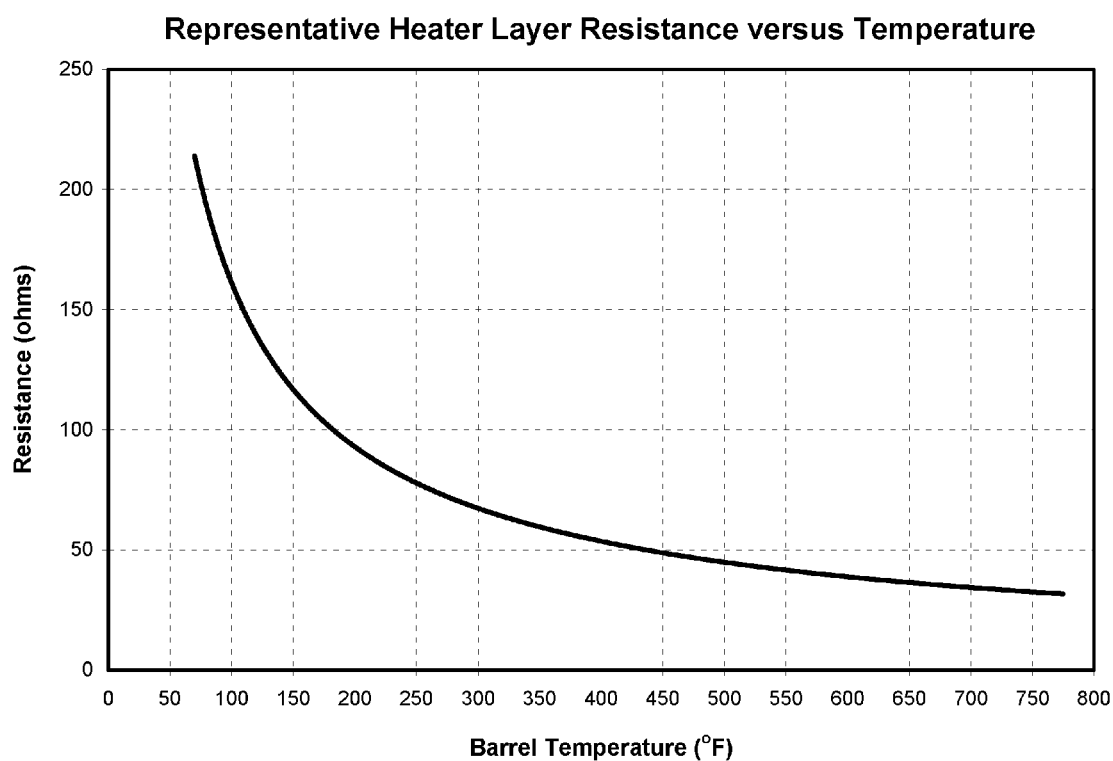
FIG. 20 is a representative chart showing how the electrical resistance of a ceramic heater layer typically drops with increasing temperature.
Figure 21:
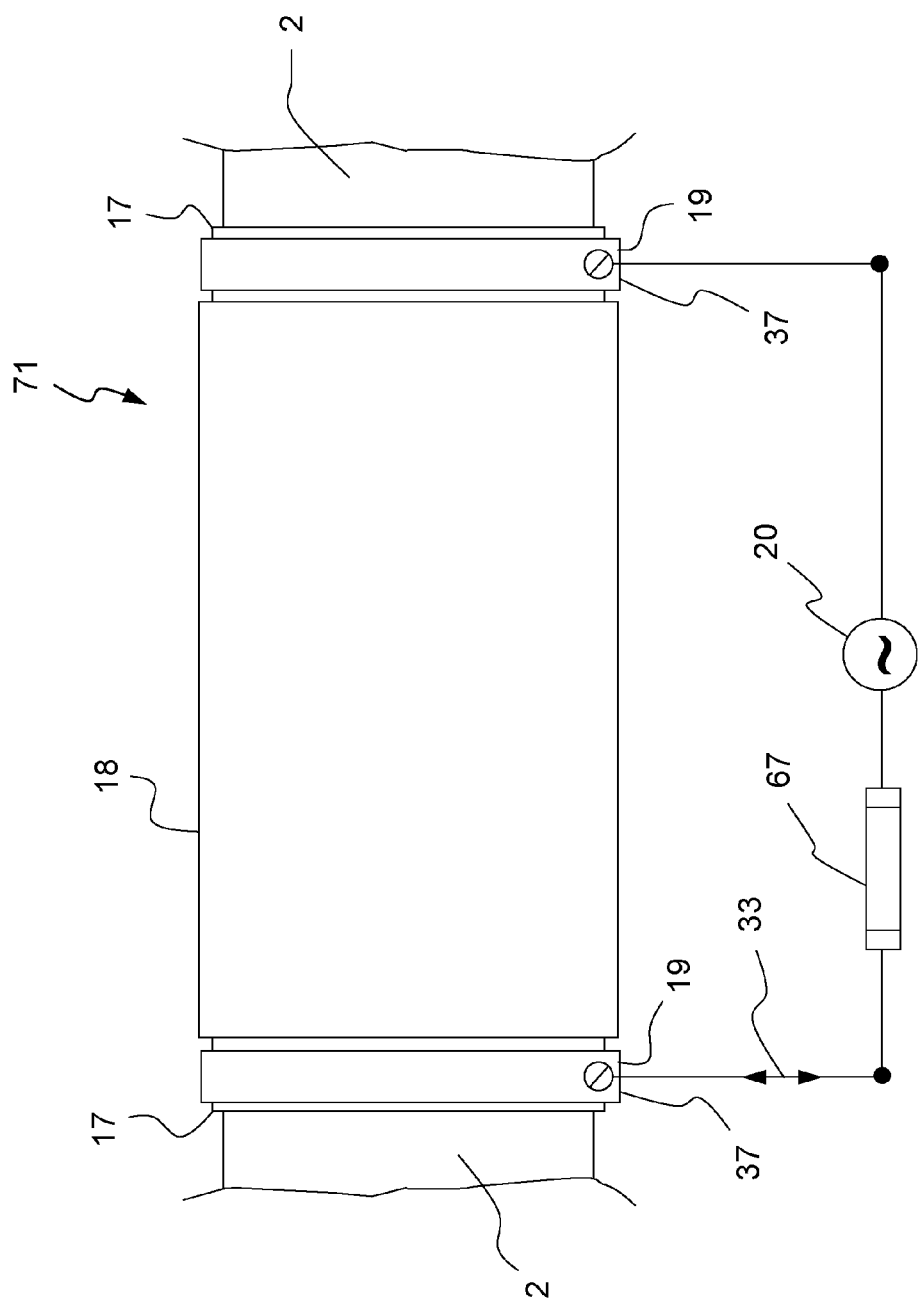
FIG. 21 is a side elevational view of the plasticating barrel shown in FIG. 6B, with the addition of an electric fuse in the power circuit.

A unique characteristic of electrically-conductive ceramic or metal-ceramic (i.e. cermet) coatings is that their electrical resistance reduces with temperature. This phenomenon is illustrated in FIG. 20 where the resistance of a representative heating layer (2 mil thick titania) is charted versus temperature. Referring now to FIG. 21, for a given supply voltage 20, the electrical current 33 passing between the electrodes 19 and through the heater layer 17 will therefore increase with temperature. A given process temperature can then be equated to a given electrical current (amperage) 33, and so a circuit breaker or fuse 67 can be incorporated into the power circuit in the present invention to protect the cylindrical plasticating element 2 from reaching an undesirable, excessive temperature.

Referring now to FIG. 22A, zones 68, 69, 70 that are heated solely by the ceramic heating system 71 (i.e. referring to herein, in combination, the ceramic heating and insulating layers 16, 17, 18, electrodes 19 with terminals 37, and power supply 20) can be combined on the same cylindrical plasticating element 2 (such as a barrel) with zones 72, 73 that are heated entirely or partially by conventional band-heaters 4, 7. This mixed approach allows the ceramic heating system 71 to be preferably used on substantial, contiguous sections of the barrel 2, while band-heaters 4, 7 can be retained on shorter sections where lower energy savings are possible. As an example, referring still to FIG. 22A, band-heaters 7 can be retained on the nozzle 74 for control of the discharge zone 73, and on sections with over-sized diameters, such as the end-bell 75, where the band-heaters 4 can even be electrically connected in parallel with the ceramic heating system 71 for control of a hybrid zone 72.

Figure 2A:
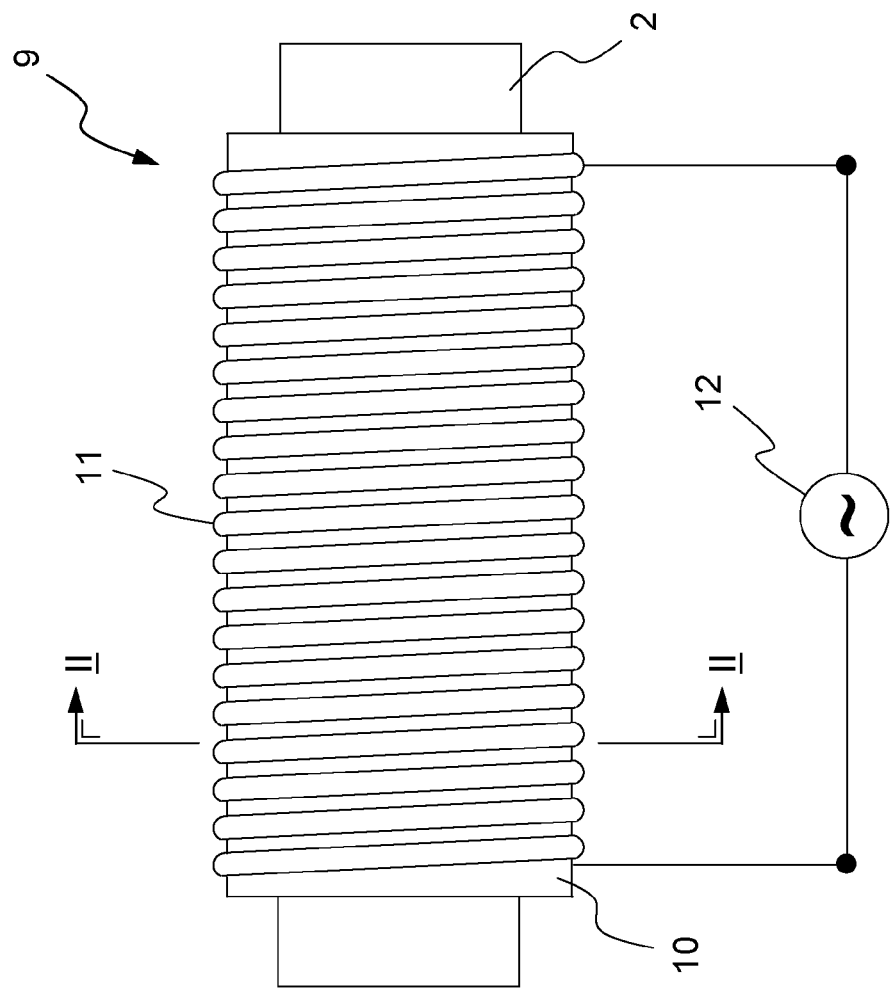
FIG. 2A is a partial view of a plasticating barrel equipped with an induction heating system.

Referring next to FIGS. 2A and 22B, because the ceramic materials used in the ceramic heating system 71 are generally not ferrous or magnetic, induction heating system coils 11 can be installed around the exterior thermal insulting layer 10, 46 to further enhance heating of the barrel 2, or in the event there is a failure in the underlying ceramic heating system 71.

Referring now to FIGS. 21 and 22C, because the outer surface of the present invention's external electrical insulating layer 18 is preferably smooth, band-heaters 4 may also be installed around the electrical insulating layer 18 of enhanced heating.

Figure 23:
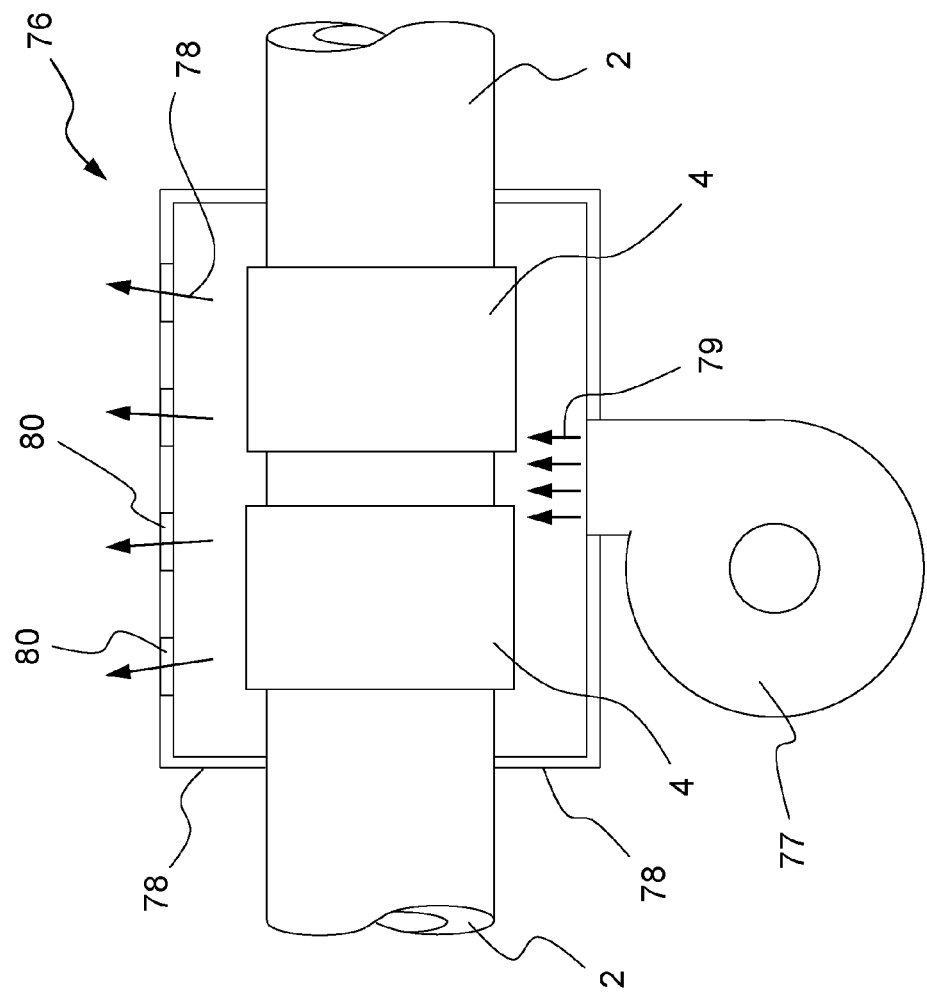
FIG. 23 is a partial sectional side-view of a plasticating barrel with an air-cooling system.
Figure 24:
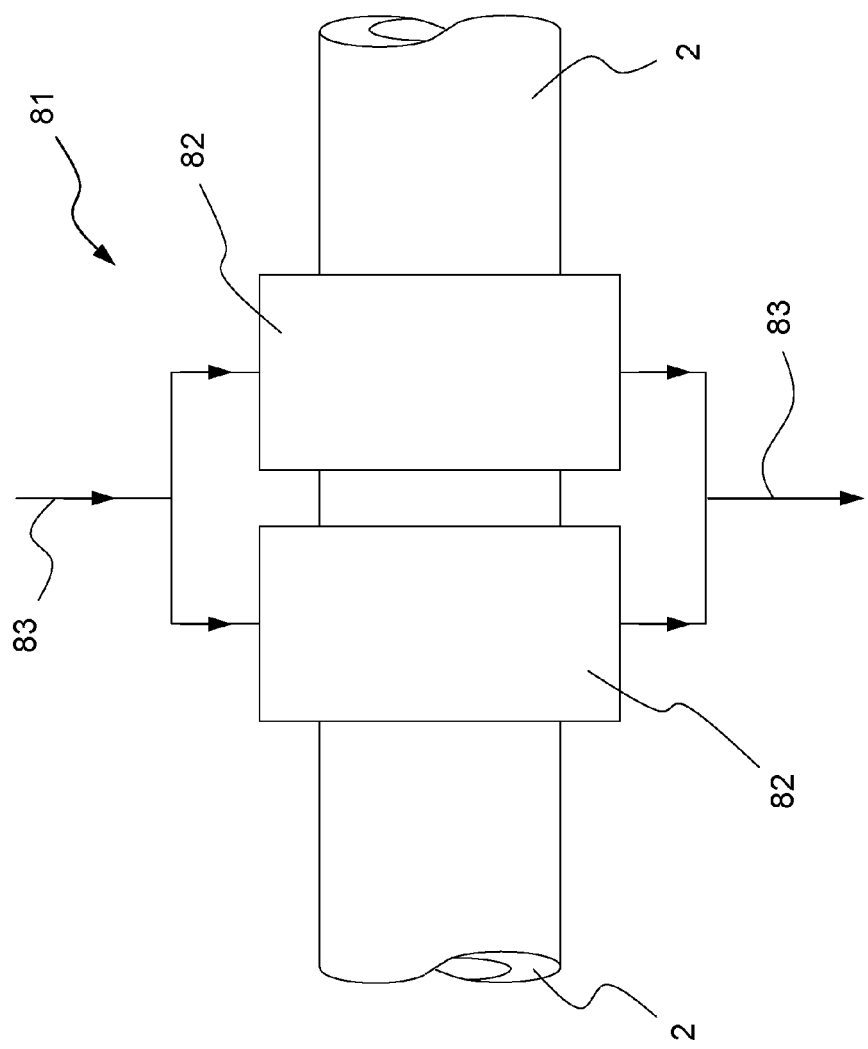
FIG. 24 is a side elevational view of a plasticating barrel with water-cooling jackets.
Figure 25:
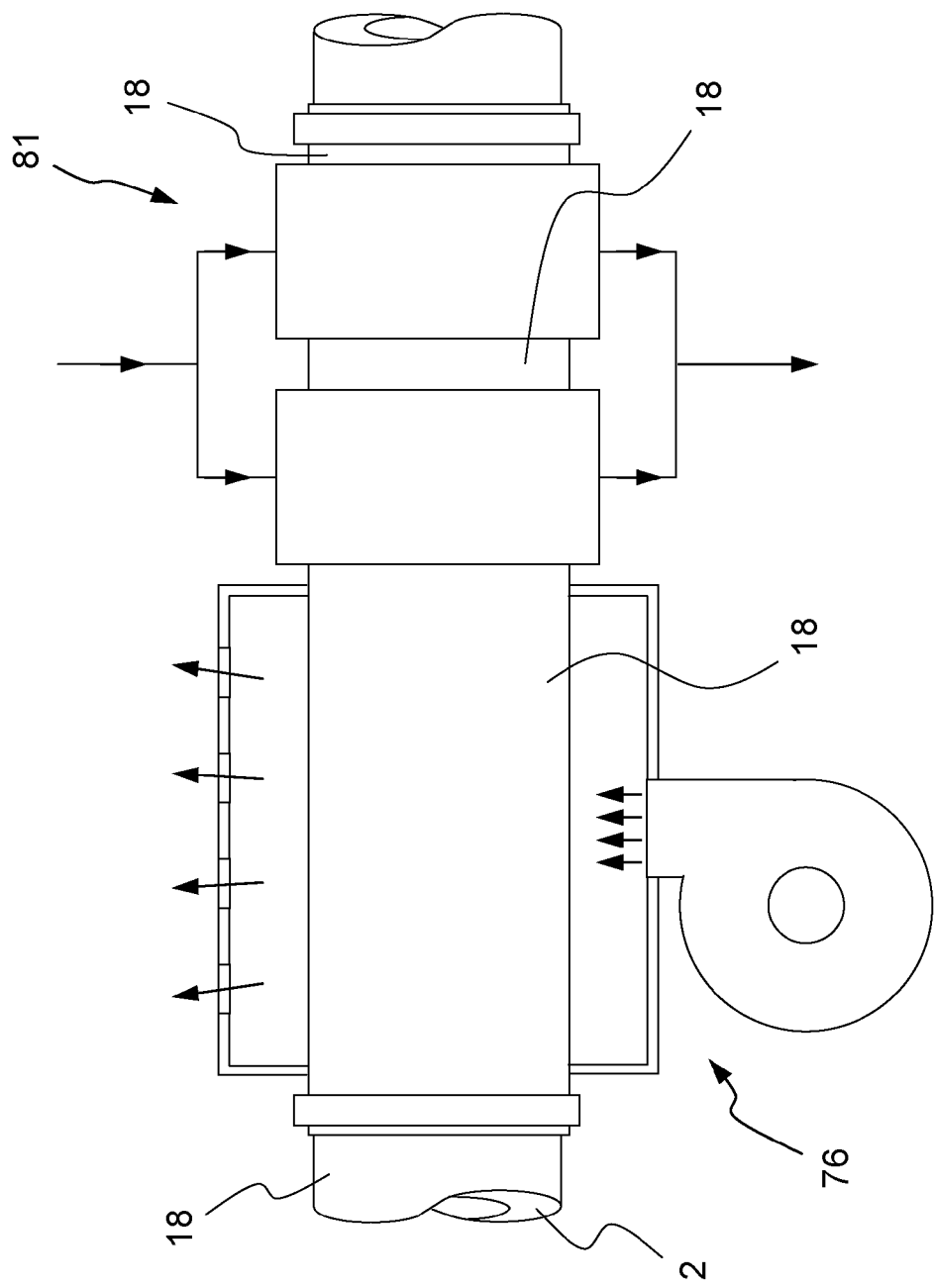
FIG. 25 is a side elevational view of the plasticating barrel shown in FIG. 21, with the addition of air-cooling and water-cooling equipment installed around the present invention.

Cooling of the cylindrical plasticating barrel 2 is often required, particularly on extruders where internal viscous heating of the processed materials can produce excess heat. As illustrated in FIG. 23, one conventional way to cool a barrel 2 and its surrounding band-heaters 4 is to use an air-cooling system 76 that typically comprises at least one or more air blowers (fans) 77 and constraining a sheet-metal enclosure 78 or shroud to circulate cooling air 79 around the barrel 2 prior to discharging it to ambient through discharge vents 80. As shown next in FIG. 24, another conventional way to cool a barrel 2 is to use a water-cooling system 81 that typically comprises water-cooled band-heaters or jackets 82 that incorporate flow-channels through which cooling water 83 can be circulated. Referring now to FIG. 25, because the outer surface of the ceramic heating system's external electrical insulating layer 18 is preferably smooth, conventional barrel cooling systems 76, 81 can be installed around the electrical insulating layer 18 of the present invention to cool the barrel 2.

It should be noted that the present invention can be practiced otherwise than as specifically illustrated and described herein without departing from its spirit or scope. It is intended that all such modifications and alterations be included insofar as they are consistent with the objectives and spirit of the invention.

What is claimed is:

1. An apparatus for plasticizing resinous material, comprising:
    an electrically conductive barrel having a longitudinal axis, along which material moves axially from an inlet to an outlet;
    a rotatable screw disposed within and cooperating with an inner wall of said barrel, said screw adapted for plasticating resinous material fed into said barrel through said inlet as a solid, the screw having a length longitudinal axis and a main flight having a pitch arranged helically on and extending radially from a core of the screw forming a channel;
    a primary heating system comprising at least one laminated ceramic heater deposited on said barrel by plasma spraying having a longitudinal length along the longitudinal axis of the barrel, the ceramic heater having an electrical insulating layer interposed between a ceramic heater layer and an outer wall of the barrel, said laminated ceramic heater layer comprises a mixture of titania and ductile metal proportioned to have a coefficient of thermal expansion approximating a coefficient of thermal expansion of said barrel and wherein said primary heating system comprises a plurality of laminated ceramic heater layer stripes arranged in a spiral configuration around the longitudinal axis of the barrel, and at least one of said laminated ceramic heater layer stripes has a pitch different from an adjacent heater layer stripe in order to avoid obstructions on said barrel;
    the longitudinal length of the ceramic heater is arranged over a portion of the screw length; and
    a secondary heating system arranged at least in part over said primary heating system.

2. The apparatus of claim 1, wherein said secondary heating system comprises at least one induction heater.

3. The apparatus of claim 2, further comprising a thermal insulating layer interposed between said primary heating system and the at least one induction heater of said secondary heating system.

4. The apparatus of claim 1, wherein said secondary heating system comprises at least one resistive band-heater.

5. The apparatus of claim 4, wherein said secondary heating system comprises a plurality of resistive band-heaters, at least one of which is located on a portion of the apparatus not covered by said primary heating system.

6. The apparatus of claim 1, wherein said primary heating system comprises a plurality of laminated ceramic heater layer stripes arranged substantially parallel to the longitudinal axis of the barrel.

7. The apparatus of claim 1, wherein said primary heating system comprises a plurality of laminated ceramic heater layer stripes arranged in a spiral configuration around the longitudinal axis of the barrel, and each said laminated ceramic heater layer stripe has a constant pitch.

8. The apparatus of claim 1, wherein said laminated ceramic heater layer stripes are electrically connected in parallel with each other.

9. The apparatus of claim 1, wherein at least a portion of said secondary heating system is electrically connected in parallel with said primary heating system.

10. The apparatus of claim 1, further comprising a cooling system for at least part of said apparatus for plasticizing.

11. The apparatus of claim 10, wherein said cooling system comprises a forced air device.

12. The apparatus of claim 10, wherein said cooling system comprises a liquid cooling jacket.

13. The apparatus of claim 1, wherein said primary heating system is divided into sections along the length of said barrel.

14. The apparatus of claim 13, wherein said primary heating system has at least three sections of substantially equal longitudinal lengths.

15. The apparatus of claim 1, wherein each laminated ceramic heater layer stripe is approximately 1 inch wide.

16. The apparatus of claim 15, wherein each laminated ceramic heater layer stripe is substantially 2 mils thick.

17. An apparatus for plasticizing resinous material, comprising:
    an electrically conductive barrel having a longitudinal axis upon which material moves axially from an inlet to an outlet;
    a rotatable screw disposed within and cooperating with an inner wall of said barrel, said screw adapted for plasticating resinous material fed into said barrel through said inlet as a solid, the screw having a longitudinal axis and a main flight having a pitch arranged helically and extending radially from a core of the screw, forming a channel; and
    a primary heating system comprising at least one laminated ceramic heater deposited on said barrel by plasma spraying having a longitudinal length along the longitudinal axis of the barrel, the laminated ceramic heater having an electrical insulating layer interposed between a ceramic heater layer and an outer wall of the barrel, the longitudinal length of the ceramic heater being arranged with at least two continuous stripes extending over at least a portion of the screw length in a spiral configuration with said stripes being electrically connected in parallel by electrode bands, and said ceramic heater layer further comprising a mixture of titania and ductile metal proportioned to have a coefficient of thermal expansion approximating a coefficient of thermal expansion of said barrel.

* * * * *